(12) United States Patent
Carnell

(10) Patent No.: US 11,291,198 B2
(45) Date of Patent: Apr. 5, 2022

(54) METHODS AND SYSTEMS FOR BIRD DETERRENCE AND MAINTENANCE THEREOF

(71) Applicant: BirdBrAin Inc., Clayton, NC (US)

(72) Inventor: Brian Carnell, Clayton, NC (US)

(73) Assignee: BirdBrAIn Inc., Clayton, NC (US)

( * ) Notice: Subject to any disclaimer, the term of this patent is extended or adjusted under 35 U.S.C. 154(b) by 279 days.

(21) Appl. No.: 16/685,895

(22) Filed: Nov. 15, 2019

(65) Prior Publication Data

US 2020/0156784 A1  May 21, 2020

Related U.S. Application Data

(60) Provisional application No. 62/768,516, filed on Nov. 16, 2018, provisional application No. 62/768,542, (Continued)

(51) Int. Cl.
*B64C 39/02* (2006.01)
*A01M 29/06* (2011.01)
(Continued)

(52) U.S. Cl.
CPC ............ *A01M 29/24* (2013.01); *A01M 29/06* (2013.01); *A01M 29/10* (2013.01); *A01M 29/16* (2013.01);
(Continued)

(58) Field of Classification Search
CPC .... A01M 29/24; A01M 29/06; A01M 31/002; A01M 29/10; A01M 29/16; B64C 39/02;
(Continued)

(56) References Cited

U.S. PATENT DOCUMENTS

| 4,736,907 A * | 4/1988 | Steffen | B64D 45/00 244/1 R |
| 5,774,088 A * | 6/1998 | Kreithen | A01K 15/02 342/22 |

(Continued)

FOREIGN PATENT DOCUMENTS

| CN | 202476328 U | 10/2012 |
| CN | 205390157 U | 7/2016 |

(Continued)

OTHER PUBLICATIONS

"Drone Fully Autonomously Perform Basic Maintenance, Swapping Out Batteries," Youtube.com. Nov. 15, 2019. 4 pages.
(Continued)

*Primary Examiner* — Yonel Beaulieu
(74) *Attorney, Agent, or Firm* — Fish IP Law, LLP

(57) ABSTRACT

Systems and methods for effectively repelling pest animals (e.g., birds), including drones that adopt complex deterrent strategies (e.g., cooperative strategies), establishing a fuzzy boundary for a geofenced area and altering pest deterrent device flight patterns based on the characteristics of the fuzzy boundaries. Deterrence strategies can be selected based on the type of pest animals, and new deterrence strategies can be generated based on outcome feedback from previous strategies (e.g., combining aspects of preexisting deterrence strategies by utilizing an AI system). Drones can be automatically maintained by comparing current drone operational status with a predetermined threshold level. A maintenance robot (e.g., a drone) can autonomously rescues a working robot (e.g., another drone) that is in trouble.

14 Claims, 15 Drawing Sheets

Related U.S. Application Data filed on Nov. 16, 2018, provisional application No. 62/768,564, filed on Nov. 16, 2018, provisional application No. 62/768,588, filed on Nov. 16, 2018, provisional application No. 62/768,718, filed on Nov. 16, 2018, provisional application No. 62/768,638, filed on Nov. 16, 2018, provisional application No. 62/768,653, filed on Nov. 16, 2018.

(51) Int. Cl.
| | | |
|---|---|---|
| *A01M 29/10* | (2011.01) | |
| *A01M 29/16* | (2011.01) | |
| *B64D 1/02* | (2006.01) | |
| *G05D 1/00* | (2006.01) | |
| *G05D 1/10* | (2006.01) | |
| *G06V 40/00* | (2022.01) | |
| *A01M 29/24* | (2011.01) | |
| *G06N 20/00* | (2019.01) | |
| *A01M 31/00* | (2006.01) | |
| *G06V 40/10* | (2022.01) | |

(52) U.S. Cl.
CPC .......... *A01M 31/002* (2013.01); *B64C 39/02* (2013.01); *B64D 1/02* (2013.01); *G05D 1/0088* (2013.01); *G05D 1/104* (2013.01); *G06N 20/00* (2019.01); *G06V 40/10* (2022.01); *B64C 2201/12* (2013.01); *B64C 2201/143* (2013.01)

(58) Field of Classification Search
CPC .......... B64C 2201/12; B64C 2201/143; B64C 39/024; B64D 1/02; G05D 1/0088; G05D 1/104; G05D 1/0094; G06N 20/00; G06K 9/00362; G06K 2209/19
See application file for complete search history.

(56) References Cited

U.S. PATENT DOCUMENTS

| | | | |
|---|---|---|---|
| 6,250,255 | B1 | 6/2001 | Lenhardt et al. |
| 9,227,726 | B2* | 1/2016 | Boren .................. B64D 45/00 |
| 9,256,994 | B2 | 2/2016 | Downey et al. |
| 9,693,548 | B2* | 7/2017 | Swaddle ............... A01M 29/18 |
| 9,928,748 | B2 | 3/2018 | Chan et al. |
| 2014/0144390 | A1 | 5/2014 | Duncan et al. |
| 2015/0127209 | A1 | 5/2015 | Al-Garni et al. |
| 2016/0307449 | A1 | 10/2016 | Gordon et al. |
| 2016/0363659 | A1* | 12/2016 | Mindell .................. G01S 13/74 |
| 2017/0231213 | A1 | 8/2017 | Gordon et al. |
| 2017/0278406 | A1 | 9/2017 | Akselrod et al. |
| 2018/0303079 | A1 | 10/2018 | Marka et al. |
| 2019/0246623 | A1 | 8/2019 | Tews |

FOREIGN PATENT DOCUMENTS

| | | |
|---|---|---|
| CN | 1065834979 A1 | 3/2017 |
| CN | 206841710 U | 1/2018 |
| JP | 2010220542 A | 10/2010 |
| WO | WO2105154148 A1 | 10/2015 |
| WO | WO2018006132 A1 | 1/2018 |
| WO | WO2018048708 A1 | 3/2018 |

OTHER PUBLICATIONS

Handbook of Industrial Robotics, Second Edition. John Wiley & Sons, Inc. 1999. 20 pages.
Nof, Simon Y., "Handbook of Industrial Robotics" 2nd ed., John Wiley & Sons, Inc., 1999, 20 pages.
"Drone Fully Autonomously Perform Basic Maintenance, Swapping Out Batteries" YouTube, posted Aug. 25, 2019, downloaded Nov. 15, 2019, 4 pages.

* cited by examiner

METHODS AND SYSTEMS FOR BIRD DETERRENCE AND MAINTENANCE THEREOF

CROSS-REFERENCE TO RELATED APPLICATIONS

This application claims the benefit of priority to U.S. Patent Provisional Application No. 62/768,516, U.S. Patent Provisional Application No. 62/768,542, U.S. Patent Provisional Application No. 62/768,564, U.S. Patent Provisional Application No. 62/768,588, U.S. Patent Provisional Application No. 62/768,718, U.S. Patent Provisional Application No. 62/768,638, and U.S. Patent Provisional Application No. 62/768,653, all filed on Nov. 16, 2018. These and all other referenced extrinsic materials are incorporated herein by reference in their entirety.

FIELD OF THE INVENTION

The field of the invention is pest deterrent systems and methods.

BACKGROUND

The following description includes information that may be useful in understanding the present invention. It is not an admission that any of the information provided herein is prior art or relevant to the presently claimed invention, or that any publication specifically or implicitly referenced is prior art.

Birds continue to pose a threat to airports, business and residential areas. Unmanned flying vehicles (e.g., drones) have been used to chase birds. Chinese Patents CN106483979A, CN205390157U, CN206841710U each teaches an unmanned flying vehicle, i.e., a drone, used to deter birds. However, they do not teach multiple drones designed to work together. United States Patent Publication No. US 2015/0127209A1 by Al-Garni et al (hereinafter "Al-Garni") teaches a bird repellent system including a ground vehicle and an airborne vehicle to optimize the effect against both sitting birds and birds in flight. However, Al-Garni does not each multiple airborne vehicles (i.e., drones) that communicate with each other.

United States Patent Publication No. US 2014/0144390A1 by Duncan et al (hereinafter "Duncan") teaches two unmanned aerial vehicles for directing a bird away, each having an emitter that is configured to cooperatively work together to beam ultrasound toward the bird. However, the cooperation in Duncan is limited to producing ultrasound by the emitters, not other aspects (e.g., motion). Moreover, Duncan does not teach using any deterrent strategy in directing the bird away.

PCT Publication No. WO 2018/006132 A1 by Tews et al (hereinafter "Tews") teaches a pest deterrent system using simple deterrent strategies, including an acoustic signal, a motion, an illumination, and request for human presence. Since birds can quickly figure out and adapt to such simple strategies, they are not as effective as complex strategies that are less predictable. Moreover, Tews does not teach cooperation between multiple deterrent devices.

Thus, there is still a need for systems, devices, and methods in which one or more drones use complex deterrent strategies and work cooperatively to achieve more effective bird deterrence.

U.S. Pat. No. 9,928,748 to Chan teaches a geofence assigning system where regions are divided into static geofences, where the parameters of each geofence are pre-set by the user and stored in a repository. However, the reference does not teach a dynamic geofence creation system where each geofence can vary according to environmental and geographic factors.

U.S. Pat. No. 9,256,994 to Downey teaches assigning one of a plurality of pre-set geofences in which to operate a pest deterrent device, where the geofence parameters are set according to legal regulations in the area of operation. However, the reference does not teach generating and assigning dynamic geofences in which to operate pest deterrent devices, where each geofence parameter changes according to time of day, environmental factors, geographic factors, and the location of other entities within the geofenced area.

Thus, there is still a need for a method for establishing dynamic boundaries for geofences and altering pest deterrent device flight patterns based on the characteristics of the boundary.

Conventional drone systems require significant effort from users to make judgment calls on whether or not a drone can operate under various existing and changing conditions, including, for example, inclement weather, changes in wind speed, and accumulated wear and tear. Though conventional drone systems can react to some environmental variables (e.g., obstacles), they fail to provide a means for automatically determining whether a drone can handle an upcoming task in response to changing environmental conditions and the condition of the drone. Further, conventional drone systems do not contemplate the use of automatic maintenance systems to maintain the operational status of a drone by causing the drone to execute actions that cause it to be repaired to a level that meets a tolerance level for particular tasks.

US Patent Application Pub. No. 2016/0307449 A1 to Gordon teaches an autonomous drone service system that causes a drone to provide a service at a location associated with a request signal. However, Gordon merely teaches a way to provide service using drones. Gordon does not teach methods and systems of automatically maintaining drones, especially based on the operational and physical characteristics of the drones.

US Patent Application Pub. No. 2017/0278406 A1 to Akselrod teaches a drone coordination system that detects adverse weather conditions and a plurality of drones operating in the region affected by the adverse weather conditions. Akselrod further teaches that, upon detection of the adverse weather condition, the system causes the affected drones to land in an emergency landing location. However, Akselrod does not teach methods and systems of continuous drone maintenance. Instead, Akselrod merely focuses on the avoidance of harm to a plurality of drones.

Gordon, Akselrod, and all publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for an automatic drone maintenance system that automatically causes the drone to execute maintenance actions if unsuitable for an assigned task.

US 20170231213 to Gordon teaches a pest deterrent device that identifies a pest animal type based on pest animal emissions, assigning a risk level of pest animal based on number of pest animal presence and environment of pest animal activity, and releasing an aerosolized substance to deter the pest animals from the area. However, the reference does not teach identifying a pest animal based on at least pest animal behavior, choosing a deterrence strategy based on the pest animal, and executing the deterrence strategy.

US 20180303079 to Marka teaches a pest deterrent device system that detects pest animal via acoustic sensors, identifying the pest animals via acoustic signature, and removing pest animal from the area via a light barrier coupled to the pest deterrent device. However, the reference does not teach removing pest animals from an area by the movement (deterrence strategy) of the pest deterrent device, or pest deterrent devices in tandem.

WO 2015154148 to Ehrlich teaches a pest deterrent device system that deters pest animal from an area by determining the types of pest animals via analysis of flight image data, and then assigning a poisonous bait release program based on the analysis. However, the reference does not teach identifying pest animal identity based on past and present pest animal data, choosing a deterrence strategy based on the pest animal, and executing the deterrence strategy.

WO 2018048708 to Cantrell teaches identifying one pest animal via visual inspection and a second pest animal via visual inspection, where the data from both pest animal inspections is combined to form combined pest animal data. However, the reference does not teach deriving new deterrence strategies based on the effectiveness of the executed deterrence stop.

Airplane flight has become an indispensable tool for the modern human, making long distance traveling quick and inexpensive. However, airplanes are susceptible to animal-initiated accidents. For example, there exists an accident report related to airplane flight, where an airplane was forced to an emergency landing due to engine failure caused by damaged from colliding with a flock of geese. (https://www.thesun.co.uk/archives/news/1134166/food-poisoning-dead-bodies-and-hitting-a-flock-of-geese-these-are-the-worst-flying-stories-youll-ever-hear.) In this accident, geese hit on the airplane when the airplane was on the final approach onto the airport runway. As such, it is clear that flight areas close to an airport must be kept completely clear of interference to avoid future accidents.

CN202476328U to Xie discloses a system for repelling birds from flight area by using a laser beam. This system automatically recognizes a flying bird, and can determine the flight path of the flying bird and repel the flying bird through laser beams. Similarly, U.S. Pat. No. 6,250,255 to Lenhardt uses an external stimulus, for example, pulsing microwaves, vibration or supersonic sound waves, in order to repel birds and/or animals from specific areas. However, these two patents do not consider which type the flying bird belongs to, such that repelling birds is not effectively accomplished. For example, the same bird may return to the same place again.

Thus, there is still a need for methods in which one or more pest deterrent devices execute deterrence strategies against pest animals, and derive new deterrence strategies from the completed deterrence strategies so as to achieve more effective pest animal deterrence.

An unmanned aerial vehicle, commonly known as a drone, is an aircraft without a human pilot aboard. Because drones do not require human involvement, they can be used for tasks associated with dangers, for example, routine inspections of power plants, security of facilities, mapping and surveying at dangerous places, and emergency response. Drones can carry one or more sensors, for example, a camera used to take pictures after an earthquake, or a thermocouple for measuring the ambient temperature inside a power plant.

This website includes a video showing autonomous battery changes in drones (https://www.youtube.com/watch?v=FLHh9t0c1RQ). In the video, a drone autonomously comes to a non-human-based facility, changes the battery without human assistance, and flies out again by itself. However, there is no discussion of repairing a drone that is unable to fly. Parker and Draper disclose automated repair of a robot in a maintenance facility, but the robot needs to be brought to the facility by a human. Robotics and applications in maintenance and repair, in Handbook and Industrial Robotics, $2^{nd}$ Edition, 1998).

Thus, there is still a need for systems, methods and devices in which a maintenance robot identifies that another robot (a working robot) needs repairs, and then autonomously brings that other robot to a maintenance location.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides products, apparatus, systems and methods in which a pest animal deterrent system having one or more drones that adopt complex pest animal deterrent strategies, including a complex cooperative strategy.

A "complex deterrent strategy" refers to a deterrent strategy in which pest animals cannot easily predict the future action of a deterrent device. Without a complex strategy, pest animals quickly learn to adapt to the deterrent device and learns to counter the deterrent device. A complex strategy can be adopted by a single deterrent device, or by multiple deterrent devices cooperating with each other. The complexity can be further increased by randomly selecting a complex strategy from a variety of complex strategies and/or by cooperation between multiple deterrent devices that can differ in size or function.

Contemplated complex strategies include: the first drone driving a target pest animal toward the second drone; the first and second drones both circling and spiraling down to a target pest animal; the first and second drones repeatedly attacking and withdrawing relative to a target pest animal; the first and second drones using different fuzzy boundaries; the first and second drones serially attacking a target pest animal; the first drone scattering a group of target pest animals while the second drone circles the group; and the first drone and the second drone simultaneously approach the pest animal from opposite directions; and each of the first and second drones lying in wait. It is further contemplated that multiple drones can use cooperative swarming when flying together.

In preferred embodiments, the pest animal deterrent system has at least two drones. The first drone can the same as or different from the second drone. For example, the first drone can be 50% larger, or 50% faster than the second drone. Preferably, drones are equipped with a sensing mechanism to detect the distance of a how far a target pest animal. Contemplated sensors include infrared, motion, light, or sound sensors. In some embodiments, at least one drone has an attack mechanism. Contemplated attack mechanisms include: using physical object (e.g., a telescoping probe, projectiles), sound (e.g., a flat speaker, sound of predatory birds), light (e.g., a flashing light, or laser), and a liquid sprayer (e.g., chemicals, or smell of predatory birds)

A preferred pest animal deterrent system also has a computing device comprising a transceiver and a processor configured to execute software instructions stored on a non-transitory computer-readable medium. The software instructions are configured to coordinate movements of the drones, as part of a strategy to increase the effectiveness of the pest animal deterrent system. The software can be further configured to apply different strategies with different types of target pest animals, or apply different strategies as a function of different environmental conditions.

The inventive subject matter also provides systems and methods in which a fuzzy boundary for a geofenced area is established (i.e., geofence determination), including systems and methods for establishing fuzzy boundaries for geofenced areas, and altering pest deterrent device flight patterns based on the characteristics of the fuzzy boundaries. Characteristics of fuzzy boundaries can be intrinsic, such as environmental conditions, or extrinsic, such as pest deterrent device activity within the geofenced area.

In some embodiments, a method of using a pest deterrent device in a geofenced area, comprising: establishing a fuzzy boundary for the geofenced area; and controlling a flight pattern of the pest deterrent device such that the pest deterrent device spends different amounts of time in different regions of the fuzzy boundary. In preferred embodiments, the geofenced area comprises land used for growing crops.

In some embodiments, the fuzzy boundary extends outwards at least 10 meters, or at least 20 meters. In some embodiments, the fuzzy boundary extends for different distances about an inner boundary. In some embodiments, the fuzzy boundary extends across a geographic feature selected from the list consisting of a road and a body of water. In some embodiments, the fuzzy boundary has at least one of a different size or shape depending on an environmental condition. In some embodiments, the fuzzy boundary has at least one of a different size or shape depending on how many additional pest deterrent devices are operating within the geofenced area. In some embodiments, the pest deterrent device is used to deter birds from the geofenced area, and the fuzzy boundary has at least one of a different size or shape depending on how many of the birds are identified to be within the geofenced area.

In some embodiments, the method further comprises using a characteristic of the fuzzy boundary to assist in determining the different amounts of time the pest deterrent device spends in the different regions. In some embodiments, the characteristic comprises an outwardly extending gradient, such that the pest deterrent device spends progressively less time towards an outer perimeter of the fuzzy boundary than towards an inner perimeter of the fuzzy boundary. In some embodiments, the different amounts of time that the pest deterrent device spends in different regions of the fuzzy boundary is random or pseudo-random. In some embodiments, the different amounts of time that the pest deterrent device spends in a region of the fuzzy boundary is driven at least in part by proximity of the region to a geographic feature.

The inventive subject matter also provides automatic drone maintenance systems and methods that automatically cause a drone to execute maintenance actions if unsuitable for an assigned task, including methods for automatically maintaining a drone comprises setting a threshold for a tolerance level of the drone, with respect to an environmental condition. When the environmental condition is present, the method contemplates controlling a behavior of the drone to fall within the tolerance level of the drone.

The present invention contemplates that an automatic drone maintenance system sets a threshold tolerance level from a drone with respect to an environmental condition. Environmental conditions are contemplated to include any factors or combination of factors affecting the operation of a drone. When the automatic drone maintenance system detects the presence of an environmental factor affecting drone operation, the system controls the behavior of the drone to fall within the tolerance level of the drone.

Controlling the behavior of the drone can include any passive or affirmative maintenance steps to bring the drone to a requisite operational level. It is further contemplated that the tolerance level of the drone can be task-specific and/or drone-specific.

In some embodiments, a method for automatically maintaining a drone, comprises setting a threshold for a tolerance level of the drone, with respect to an environmental condition; and when the environmental condition is present, controlling a behavior of the drone to fall within the tolerance level of the drone.

In some embodiments, controlling the behavior of the drone comprises preventing the drone from flying. In some embodiments, controlling the behavior of the drone comprises causing the drone to fly. In some embodiments, controlling the behavior of the drone comprises causing the drone to return to a home base for maintenance. In some embodiments, the maintenance is selected from the group consisting of: routine maintenance, an emergent repair, and recharging a drone power source. In some embodiments, controlling the behavior of the drone comprises causing the drone to avoid a geographical region. In some embodiments, controlling the behavior of the drone comprises causing the drone to avoid an object.

In some embodiments, the environmental condition comprises a weather condition. In some embodiments, the weather condition is selected from the group consisting of: high wind, rain, snow, sleet, and hail. In some embodiments, the environmental condition comprises a non-weather condition. In some embodiments, the non-weather condition is a local anomaly.

In some embodiments, the local anomaly can be selected from the group consisting of: man-made winds, sprinkler systems, man-made heat sources, exhaust produced by a machine, dust produced by a machine, and ash from a fire source. In some embodiments, the threshold for the tolerance level of the drone dynamically changes for a task based on weighing a priority of the task against a risk of damage to the drone.

The inventive subject matter also provides apparatus, systems and methods in which a pest deterrent device effectively repels a pest animal away from a target area by identifying a type of a pest animal. The method of repelling the pest animal begins with a step of equipping a pest deterrent device with a camera, and further includes a step of using the camera to view a flying behavior of the pest animal. The camera can be used to take consecutive pictures of the flying pest animal or take a video of the flying pest animal. In some embodiments, the pictures or the video is used to identify a flying behavior of the flying pest animal. The flying behavior can be determined by at least one of flight speed, directional changes in flight and feather movement or any combination thereof.

Once the flying behavior of the flying pest animal is determined, a type of the pest animal can be identified from the flight behavior using database. The type of pest animal can be classified by a Linnaeus classification, a wingspan, a preferred food, and a flocking behavior. The method further includes a step of using the type of pest animal to optionally select an deterrence strategy from a set of alternative deterrence strategies. The alternative deterrence strategy include a simple chase mode, a zigzagging chase mode, a repeated chasing and withdrawing mode, a circling descent mode, a random attack mode, lay in wait mode, and it can use fuzzy boundaries. The alternative deterrence strategy further comprises alternately chasing after different pest animals. Once the deterrence strategy is selected, the method is completed with a step of using a pest deterrent device either repelling the pest animal from the target area using the selected deterrence strategy or avoiding repelling the pest animal from the target area or combination of both.

In some embodiments, a method of deterring pest animals from an area, comprises using a pest deterrent device to execute a first deterrence strategy against a first one of the pest animals, and a second deterrence strategy against a second one of the pest animals, respectively; performing an analysis of relative effectiveness of the first and second deterrence strategies in deterring the first and second pest animals from the area; using the analysis to derive a third deterrence strategy; and using the pest deterrent device to execute the third deterrence strategy against a third one of the pest animals. In some embodiments, the method further comprises using an AI system to derive the third deterrence strategy. In preferred embodiments, each of the first, second, and third pest animals are birds. In some embodiments, the area comprises agricultural land used for growing crops. In some embodiments, the pest deterrent device is autonomous.

In some embodiments, the execution of the first and second deterrence strategies comprises selecting the first and second deterrence strategies based at least in part on a behavior of the pest animal. In some embodiments, the behavior of the pest animal comprises directional changes, speed of travel, posture, flight pattern, feeding style, and flocking pattern. In some embodiments, the execution of the first and second deterrence strategies comprises selecting the first and second deterrence strategies based at least in part on a type of the pest animal. In some embodiments, the type of the pest animal comprises feather coloration, pest animal species, feather size, and type of food eaten by the pest animal.

In some embodiments, the step of performing the analysis of relative effectiveness comprises comparing: a) reaction time between the first one of the pest animals to the beginning of the first deterrence strategy and the second one of the pest animals to the beginning of the second deterrence strategy, b) distance between a initial position and a final position of the first one of the pest animals after the first deterrence strategy, and between a initial position and a final position of the second one of the pest animals after the second deterrence strategy, c) amount of time until the first one and second one of the pest animals return to the area after the execution of the first and second deterrence strategies, respectively.

In some embodiments, the third deterrence strategy is derived by modification of the second deterrence strategy. In some embodiments, the third deterrence strategy is derived by combining aspects of the first and second deterrence strategies. In some embodiments, the third deterrence strategy is derived by identifying a deterrence strategy other than the first and second deterrence strategies.

In some embodiments, a method of repelling a pest animal from a target area, comprises equipping at least a first pest deterrent device with a camera; using the camera to view a behavior of the pest animal; using a database to assess a type of pest animal at least in part from the behavior; using the type of pest animal to optionally select a deterrence strategy from a set of deterrence strategies; and using a pest deterrent device to at least one of (a) repel the pest animal from the target area using the selected deterrence strategy, or (b) avoid repelling the pest animal from the target area.

In some embodiments, the behavior is selected from at least one of the groups comprising of flight speed, directional changes in flight, and feather movement. In some embodiments, the type of pest animal is based on a Linnaeus classification. In some embodiments, the type of pest animal is based on a wingspan. In some embodiments, the type of pest animal is based on a preferred food.

In some embodiments, the set of deterrence strategies comprise a simple chase mode, a zigzagging chase mode, a repeated chasing and withdrawing, a circling descent, a random attack, fuzzy boundaries, alternately chasing after different pest animals, lying in wait, or any combination thereof.

The inventive subject matter also provides apparatus, systems, and methods in which a maintenance robot identifies that another robot needs repairs or is otherwise impaired in some fashion, and then autonomously brings that other robot to a maintenance location. Of particular interest of aerial robot drones, both for the maintenance robot and the working robot.

The maintenance robot preferably includes a communication circuit configured to receive a rescue signal or other information from at least one other working robot. The information can be received directly or indirectly from the working robots. In some embodiments, the information can be lack of motion or other expected working parameter of the working robot.

Once the maintenance robot receives the rescue signal, the maintenance robot generates a first navigation path to the impaired working robot, and then execute that path.

In some embodiments, the maintenance robot has a grasper having at least one moveable component capable of grasping the impaired working robot. The maintenance robot can advantageously include a camera or other sensor to orient the grasper. Once the maintenance robot grasps the impaired working robot, it uses a second navigation system to generate the second navigation path to bring the impaired working robot to a maintenance location.

In some embodiments, the maintenance robot includes a sensor to detect obstacles in the first and second navigation paths. When the maintenance robot arrives at the maintenance location, the maintenance robot un-grasps the impaired working robot, and leaves it at the maintenance location.

In some embodiments, the maintenance robot includes a sensor configured to ascertain current weather conditions and a memory to store ranges of working weather conditions. The current weather condition includes at least one of raining, wind speed, and ambient brightness. The maintenance robot compares the current weather conditions with the ranges of the working weather conditions. When one of the current weather conditions is out of the range of the working weather conditions, it indicates a high risk that the maintenance robot gets damaged by bad weather conditions. Therefore, the maintenance robot stops working, stays at the current position.

In some embodiments, the maintenance robot carries solar cells being able to charge a rechargeable battery, such that it is not necessary to change the battery and can be able to rescue the impaired working robots for a long period of time.

In some embodiments, an autonomous maintenance robot for retrieving an impaired working robot comprises a communication circuit configured to receive a rescue signal or other information regarding the impaired working robot; a first navigation system configured to use a first navigation path to direct the maintenance robot to the impaired working robot, and a second navigation path to direct the maintenance robot to bring the impaired working robot to a maintenance location; and a grasper having at least one moveable component, configured to grasp the impaired working robot.

In some embodiments, the information comprises a location of the impaired working robot. In some embodiments, the information comprises movement data for the impaired working robot. In some embodiments, the robot further comprises on-board circuitry that triggers the maintenance robot to travel to the impaired working robot based upon at least one of the following: a lack of movement of the working robot, receipt of the rescue signal, and presence of the working robot outside a designated region.

In some embodiments, the robot further comprises a sensor configured to ascertain a current weather condition. In some embodiments, the current weather condition comprises at least one of raining, fog, high wind speed, and ambient brightness. In some embodiments, the maintenance robot delays traveling to the impaired working robot when the current weather condition is outside a predetermined range. In some embodiments, the robot further comprises a sensor configured to detect an obstacle in at least one of the first and second navigation paths.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
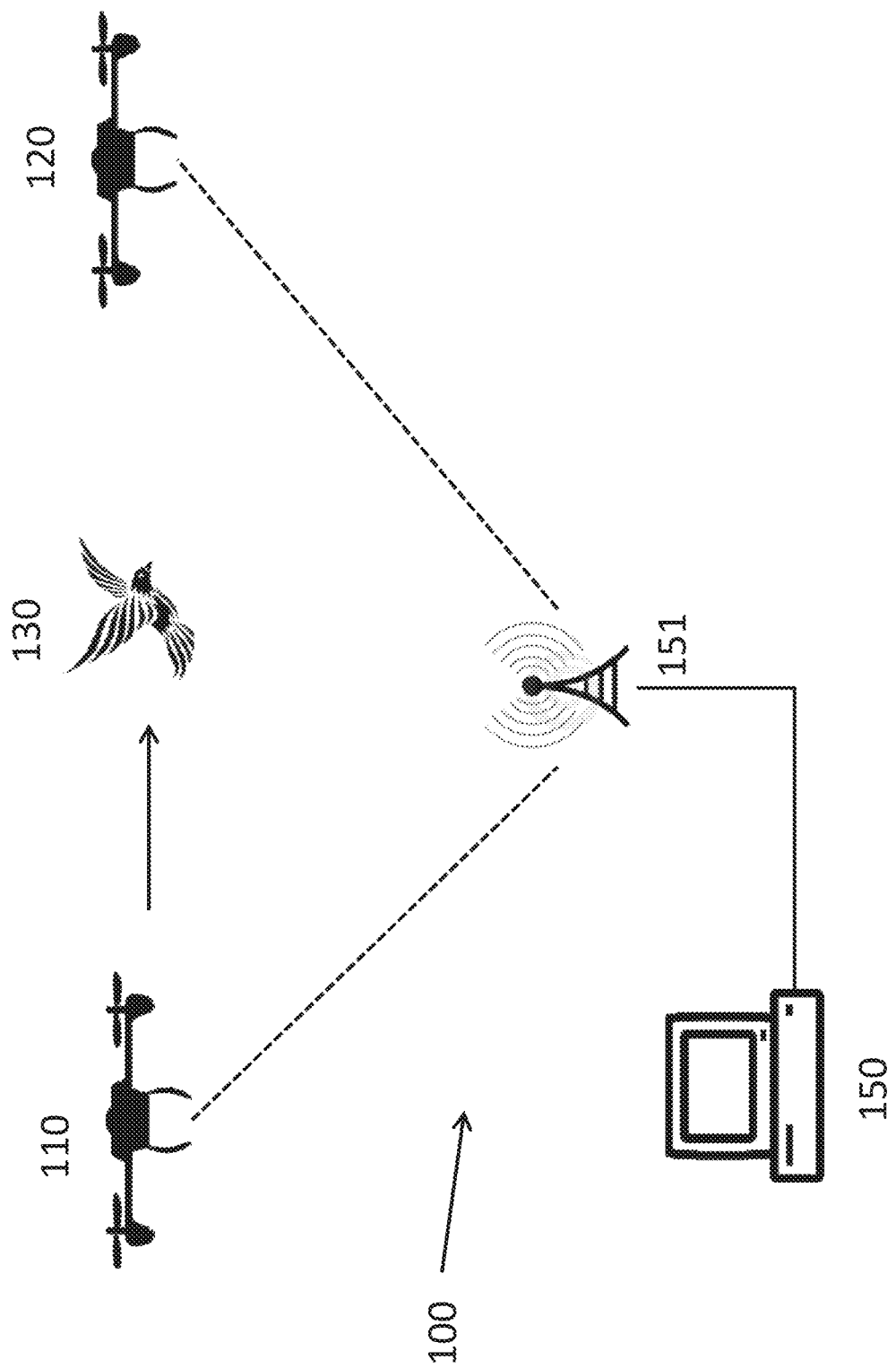
FIG. 1 is a diagram of a preferred embodiment of the cooperative pest animal deterring system using a strategy where the first drone driving a target pest animal toward the second drone.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 is a diagram of a preferred embodiment of the cooperative pest animal deterring system 100 using a strategy where the first drone 110 driving a target pest animal 130 toward the second drone 120. The second drone preferably remains stationary and motionless so that the pest animal will not be afraid to get close to it. The second drone may have a camouflage that blends into the environment, so that the pest animal can approach it without noticing it. The second drone is equipped with a motion sensor. Once the pest animal approaches the second drone within close range (e.g., 1 meter), the second drone can suddenly be activated to move towards the pest animal, attack the pest animal using one or more attack mechanisms, or both.

Figure 2:
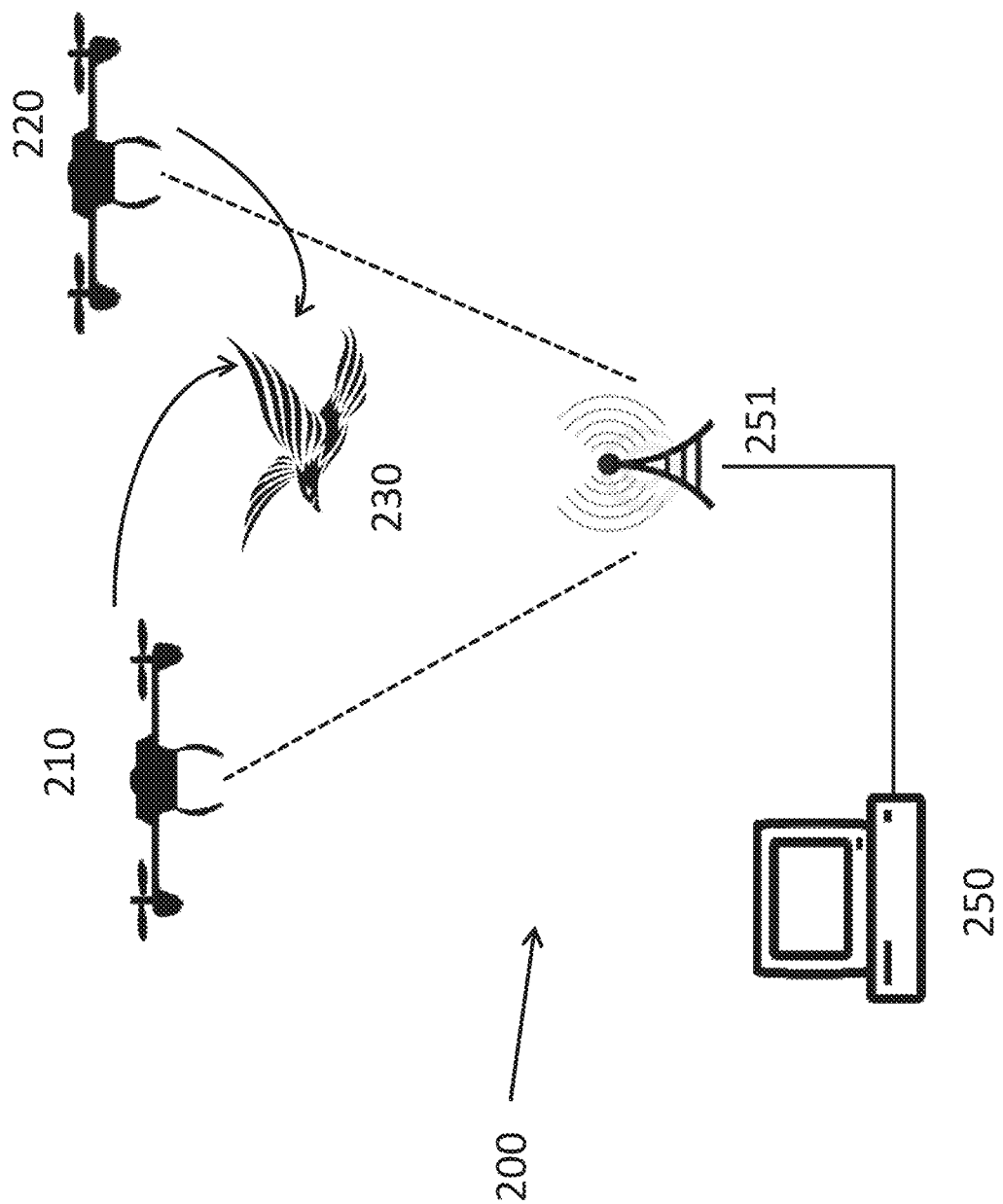
FIG. 2 is a diagram of a preferred embodiment of the cooperative pest animal deterring system using a strategy where the first and second drones both circling and spiraling down to a target pest animal.

FIG. 2 is a diagram of a preferred embodiment of the cooperative pest animal deterring system 200 using a strategy where the first and second drones (210 and 220) both circling and spiraling down to a target pest animal 230. The circling and spiraling motions serve to confuse the pest animal 230 so that it cannot predict the direction of attack. The pest animal 230 is further confused by two drones attacking at the same time. Since the pest animal cannot quickly and accurately predict the directions in which the drones are coming from, it cannot find an escape route to successfully evade an attack.

Figure 3:
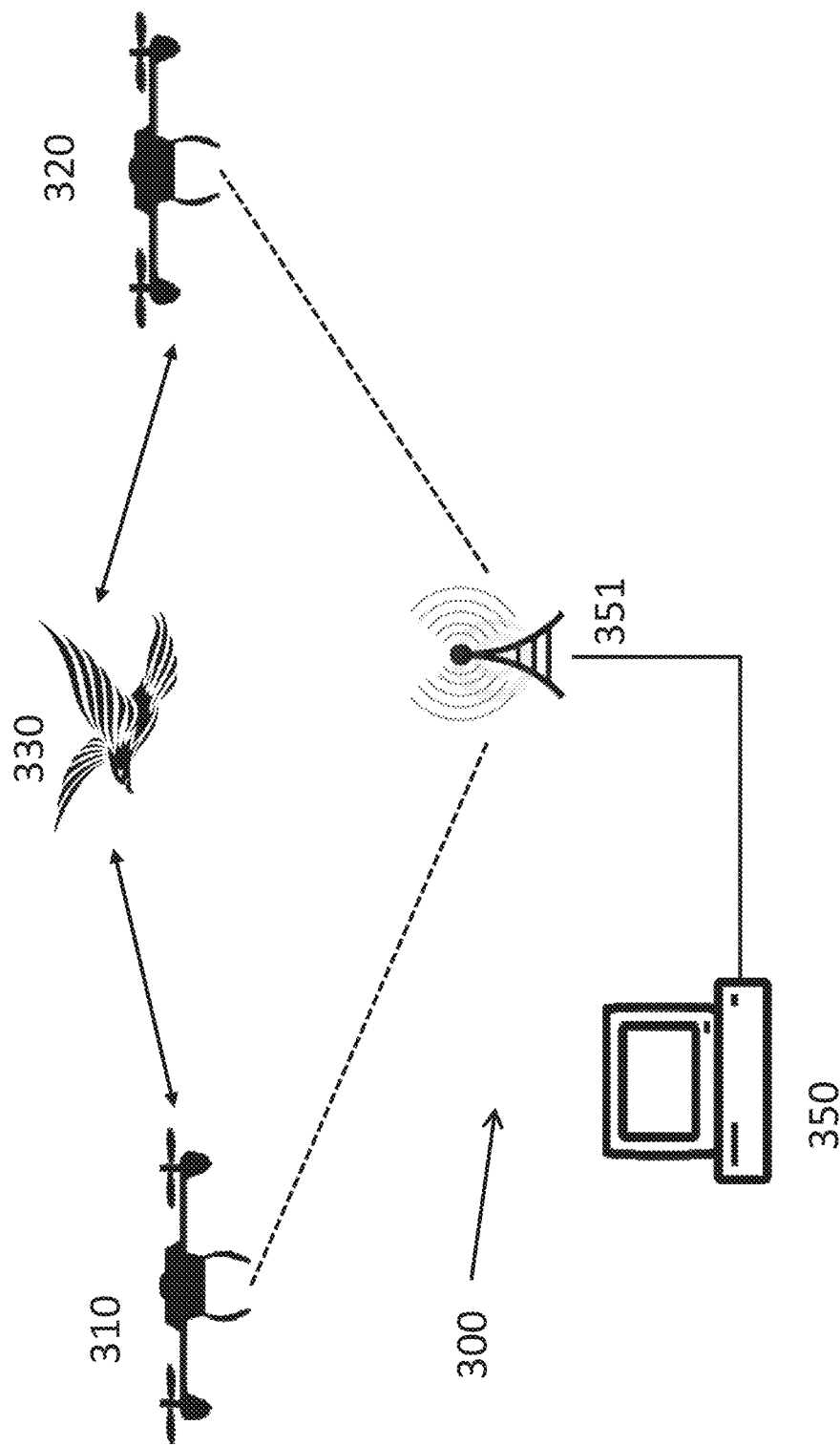
FIG. 3 is a diagram of a preferred embodiment of the cooperative pest animal deterring system using a strategy where each of the first and second drones repeatedly attacking and withdrawing relative to a target pest animal.

FIG. 3 is a diagram of a preferred embodiment of the cooperative pest animal deterring system 300 using a strategy where each of the first and second drones (310 and 320) repeatedly attacking and withdrawing relative to a target pest animal 330. The repeated attacking and withdrawing motions serve to confuse the pest animal, since typical predators do not withdraw. The drones can adopt a random distance (e.g., anywhere within the range of 1 meter) before withdrawing. The pest animal 330 is further confused by two drones attacking and withdrawing at the same time. The two drones (310 and 320) can be coordinated to 1) attack at the same time, and then withdraw at the same time, or 2) one attacks while the other withdraws. Since the pest animal 330 cannot predict how far the drones will attack before withdrawing, it is in a constant state of confusion and terror. The withdrawing mechanism also helps to protect drones so that they will not be damaged by physical impact with the pest animals or attack from the pest animals.

Figure 4:
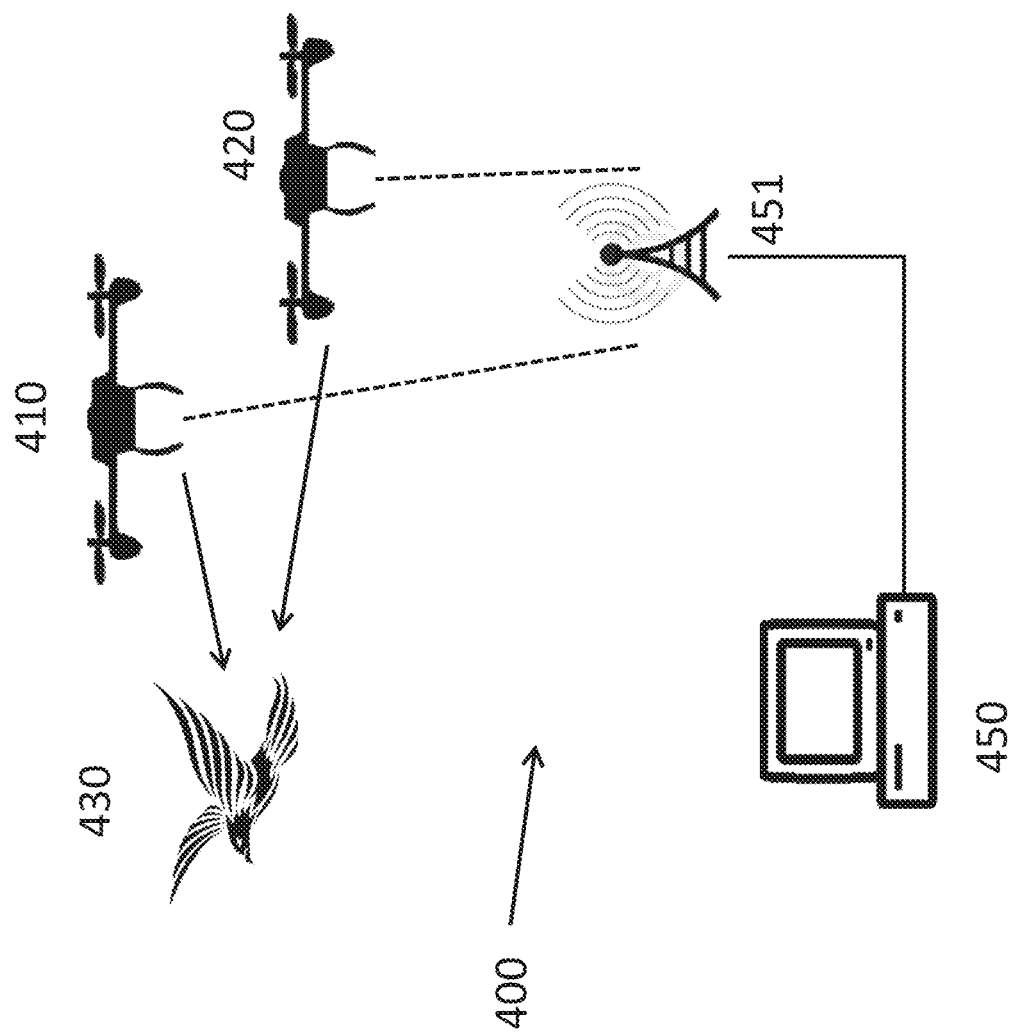
FIG. 4 is a diagram of a preferred embodiment of the cooperative pest animal deterring system using a strategy comprises the first and second drones serially attacking a target pest animal.

FIG. 4 is a diagram of a preferred embodiment of the cooperative pest animal deterring system 400 using a strategy comprises the first and second drones (410 and 420) serially attacking a target pest animal 430. In this embodiment, the two drones (410 and 420) take turns to charge at the target pest animal 430 so that the pest animal 430 feels overwhelmed. It would not be possible for one drone to keep charging at the pest animal, because it would be just a chase. The pest animal 430 feels surprised and scared with a drone suddenly and unexpectedly accelerates towards it. With two drones taking turns chasing, the pest animal 430 is constantly in the state of surprise and terror. Multiple drones can also take turns to chase the pest animal 430 to its point of exhaustion.

Figure 5:
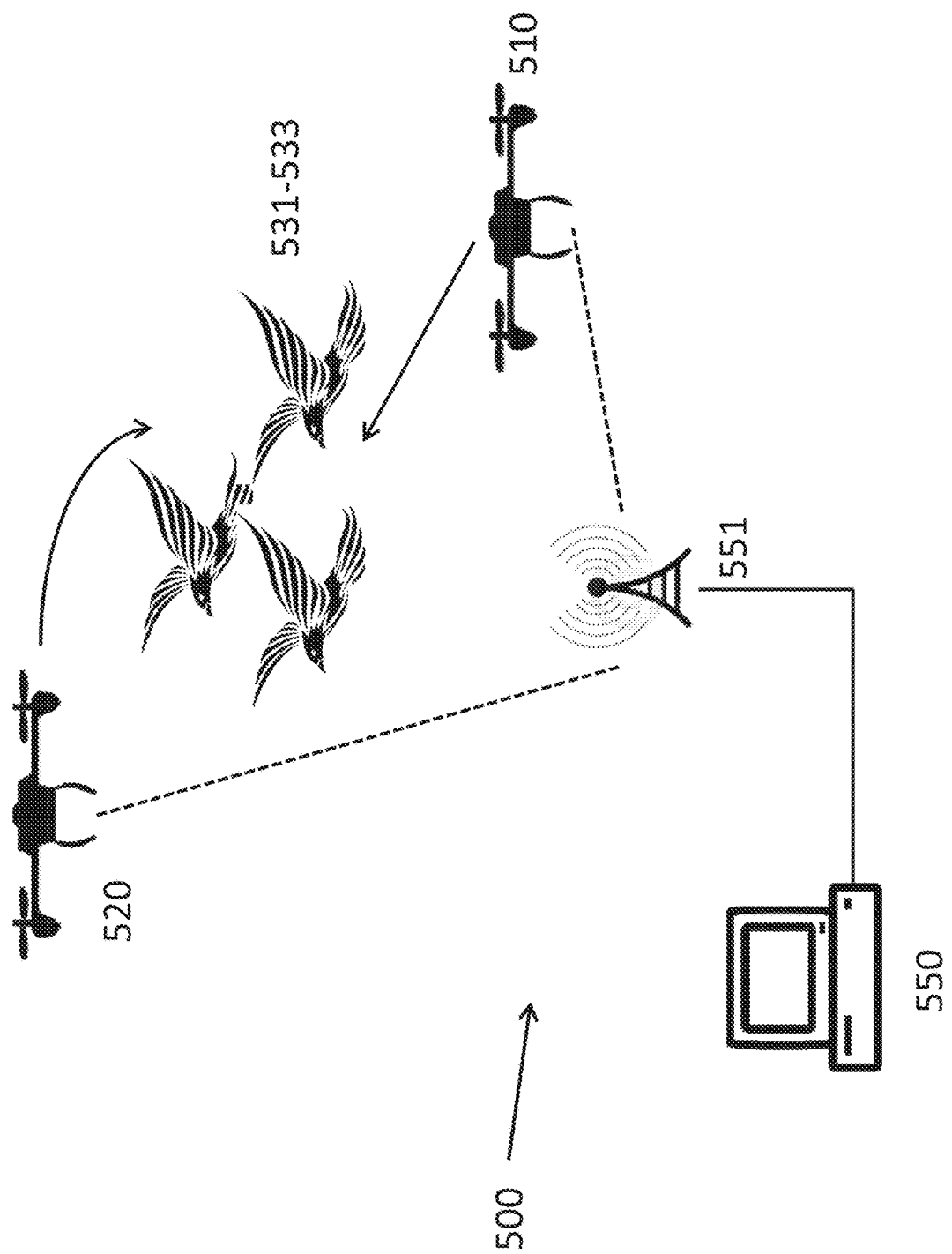
FIG. 5 is a diagram of a preferred embodiment of the cooperative pest animal deterring system using a strategy where the first drone scattering a group of target pest animals while the second drone circles the group.

FIG. 5 is a diagram of a preferred embodiment of the cooperative pest animal deterring system 500 using a strategy where the first drone 510 scattering a group of target pest animals 531-533 while the second drone 520 circles the group. With the second drone 520 circling the group, the natural tendency of the pest animals 531-533 is to stay together as a group within the boundary of the circle. However, while the first drone 510 scatters the group, the natural tendency of the pest animals 531-533 is to escape from the group. The two inconsistent the natural tendencies make the pest animal confused and scared because they don't know how to act, and end up being successfully attacked by at least one of the drones.

Figure 6:
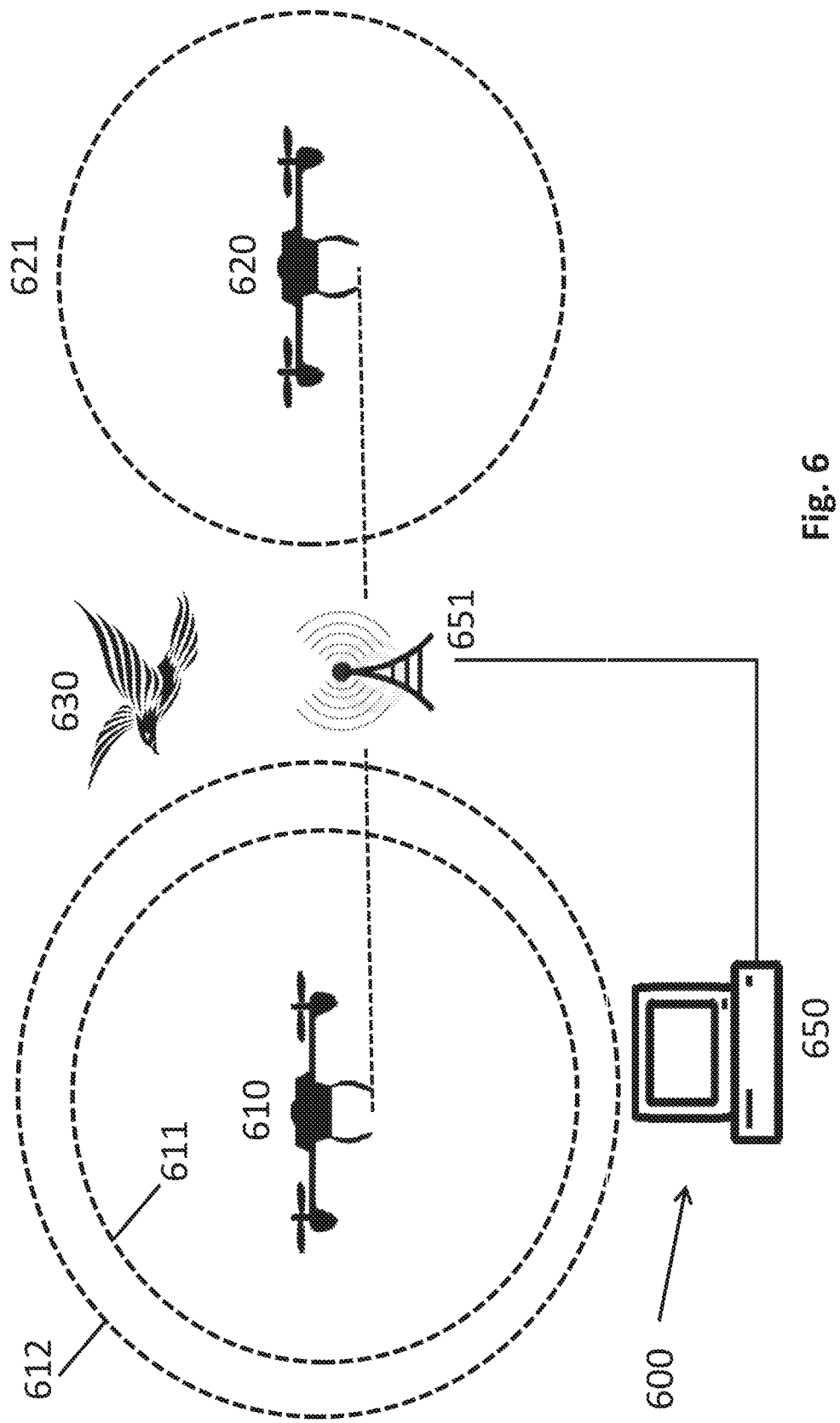
FIG. 6 is a diagram of a preferred embodiment of the cooperative pest animal deterring system using a strategy where each of the first and second drones lying in wait.

FIG. 6 is a diagram of a preferred embodiment of the cooperative pest animal deterring system 600 using a strategy where each of the first and second drones (610 and 620) lying in wait. Once the pest animal 630 gets close enough to the first drone 610, the drone will be suddenly activated to attack the pest animal. The preferred distance for activation can be set at a range between a first distance 611 and a second distance 612. The fuzzy boundary makes it impossible for the pest animal 630 to know what is a "safe distance" to stay away from the drones.

It is contemplated that more than two drones can be coordinated to work together to achieve even better result, and that different drones can have different sizes and capabilities. For example, multiple smaller drones can chase the pest animals towards a bigger drone that is equipped with an attack mechanism. When the pest animals are close to the bigger drone (within target range), the bigger drone will then launch an attack on the pest animals. In some embodiments, multiple drones (e.g., 5 or 6 drones) strategically close in from all 5 directions (front, back, left, right, and up, if the pest animal is on the floor), or 6 directions (front, back, left, right, up, and down, if the pest animal is in the air), leaving the pest animals with no way to escape.

Contemplated attack mechanisms include an attack in the form of physical contact (e.g., telescoping probe, projectile, sprays), playing a sound (e.g., loud music, ultrasound, or sound of predatory birds), a bright light (e.g., flashes, laser), smell (e.g., releasing chemicals), or a combination of the above (for example, spaying water with an unpleasant odor towards the pest animals).

As used herein, a "complex deterrent strategy" refers to a deterrent strategy in which pest animals cannot easily predict the pattern of attack. Without a complex strategy, the pest animals quickly learn to adapt to a given deterrent device, thus undermining the effectiveness of the deterrent device. A complex strategy can be adopted by a single deterrent device, but can also involve multiple deterrent devices cooperating with each other. The cooperation further increases the complexity of the deterrent strategy. The complexity can be further increased by randomly selecting a strategy from a variety of strategies, so that the pest animals cannot predict what is going to happen this time.

In some embodiments, the software can be configured to apply different strategies with different types of target pest animals, based on history of effectiveness of different strategies used on different types of pest animals. This can be achieved by having a data storage system that keeps track of relative effectiveness of different ones of the different strategies. For example, bigger pest animals (e.g., ravens, ducks, etc.) require the use of bigger drones, while smaller pest animals (e.g., sparrows, swallows) can be deterred with smaller drones.

The software can be further configured to apply different strategies as a function of different environmental conditions. For example, in sunny weather, the drones will circle the shade areas where pest animals tend to stay during the heat of the day, and use a strategy that will keep the pest animals away from the shade. Once the pest animal is out of the shade, the drone will stop chasing.

Figure 7:
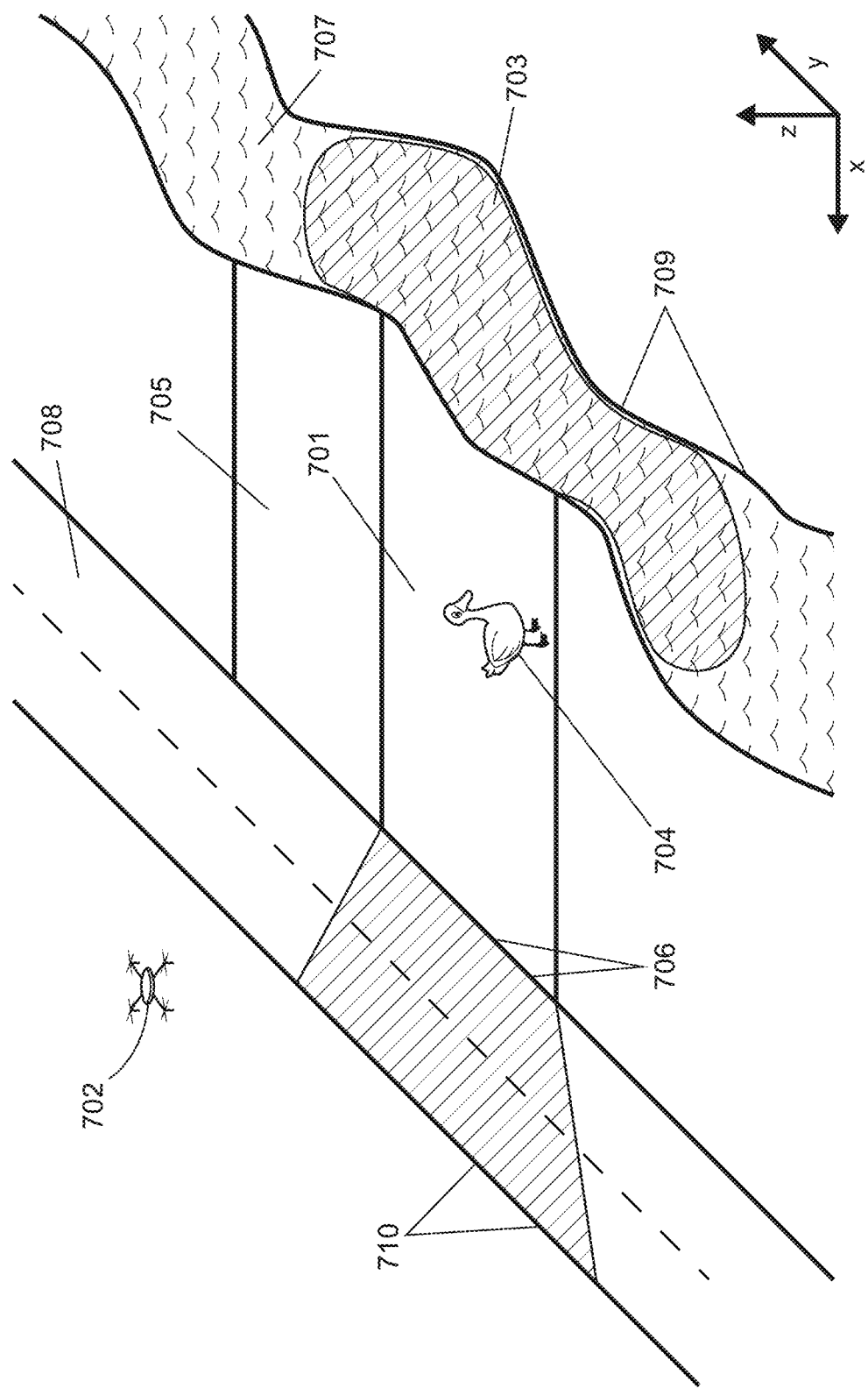
FIG. 7 illustrates a map of a region which includes a geofenced area, the extent and shape of a fuzzy boundary, and geographical features affecting the fuzzy boundary such as a river or road.

FIG. 7 is an illustration of an exemplary embodiment of the fuzzy boundary 703 of a geofenced area 701, where the fuzzy boundary 703 extends over geographic features such as river 707 and road 706. In some embodiments, fuzzy boundary 703 has at least one of a different size or shape depending on geography and environmental condition. For example, fuzzy boundary 703 may extend over geography that is public property, such as river 703, allowing the pest deterrent device to operate above the river 707. The portion of the fuzzy boundary that overlaps the river 707 is contoured to the shape of the river 707 as pest animals may not be deterred if the pest deterrent device were to stop operation at the riverbank 709 of river 707. In another embodiment, fuzzy boundary 703 extends out from geofenced area edge 706 of geofenced area 701 to outer edge of road 708. In another embodiment, the portion of the fuzzy boundary that extends over road 708 is trapezoidal, becoming wider as it continues across the road so as to allow the pest deterrent device 702 to operate in a larger area.

In some embodiments, fuzzy boundary 703 may extend at least 10 meters from the geofenced area 701 as a 10 meters fuzzy boundary width would cover the width of most roads. Fuzzy boundary 703 may extend at least 20 meters from the geofenced area as a 20 meters fuzzy boundary width would allow the pest deterrent device 702 to further deter pest animals from other geofenced area adjacent to or nearby geofenced area 701.

Fuzzy boundary 703 may be altered according to intrinsic and extrinsic factors affecting geofenced area 701. Intrinsic factors may include environmental conditions or geographic features. Environmental conditions may include the weather, noise level, time of day, wind speed, season of the year, or the like. Geographic features may include manmade features such as buildings, roads, structures, or the like. Geographic features may include natural features such as bodies of water, channels of water, open land, mountainous land, or semi-mountainous land.

In some embodiments, fuzzy boundary 703 can be altered using machine learning techniques to process data and synthesize new executable program instructions based on the intrinsic and extrinsic factors affecting geofenced area 701. For example, fuzzy boundary 703 can be set using machine learning techniques including, but not limited to, time-series classifiers, supervised learning classifiers, linear regression analyses, reinforcement learning, clustering, density estimation, and dimensionality reduction.

Based on the trends in the data determined by the machine learning techniques, fuzzy boundary 703 can be modified to better adapt to the changes in the intrinsic and extrinsic factors associated with a geographic area. For example, fuzzy boundary 703 can be modified how the boundaries change based on the particular season and the type of pest animals present in geofenced area 701 during the season.

It is contemplated that fuzzy boundary 703 can be managed by machine learning programs that can analyze data collected from one or more sensors from one or more drones to manipulate fuzzy boundary 703. For example, the machine learning programs can use image recognition data from a collection of drones to better predict when to change fuzzy boundary 703 based on the types of pest animals predicted to be in geofenced area 701 during that time of year. Using the specific identifying features, the machine learning programs can use one or more algorithms to differentiate between pests that are temporary and pests that will be around for an extended period of time. In this example, the identifying features can comprise the flight patterns and estimated sizes of pest animals.

Geographic features may further include semi-natural features such as parks, gardens, or the like. Extrinsic factors may include the amount of pest deterrent devices in or near the geofenced area, the amount of pest animals in or near the geofenced area, the proximity of the pest deterrent devices to the pest animals, or the like. Fuzzy boundary 703 may be contiguous, non-contiguous, or semi-contiguous. In other embodiments, the intrinsic and extrinsic factors may be used by an AI system to alter characteristics of fuzzy boundary 703 autonomously or semi-autonomously.

In exemplary embodiments, fuzzy boundary 703 may have a characteristic comprising outwardly extending gradient, such that the pest deterrent device spends progressively less time towards an outer perimeter of the fuzzy boundary than towards an inner perimeter of the fuzzy boundary. For example, beginning from geofenced area edge 706 to the fuzzy boundary outer perimeter 710, the pest deterrent device 702 may spend 10% of its time in the first 10% of the fuzzy boundary 703, and 20% of its time in the next 20% of the fuzzy boundary 703, and so on. In other embodiments, the pest deterrence device 702 may spend varying amounts of time in various areas of the fuzzy boundary 703. The varying amounts of time may be according to environmental conditions, geographic features, or other extrinsic factors.

Figure 8:
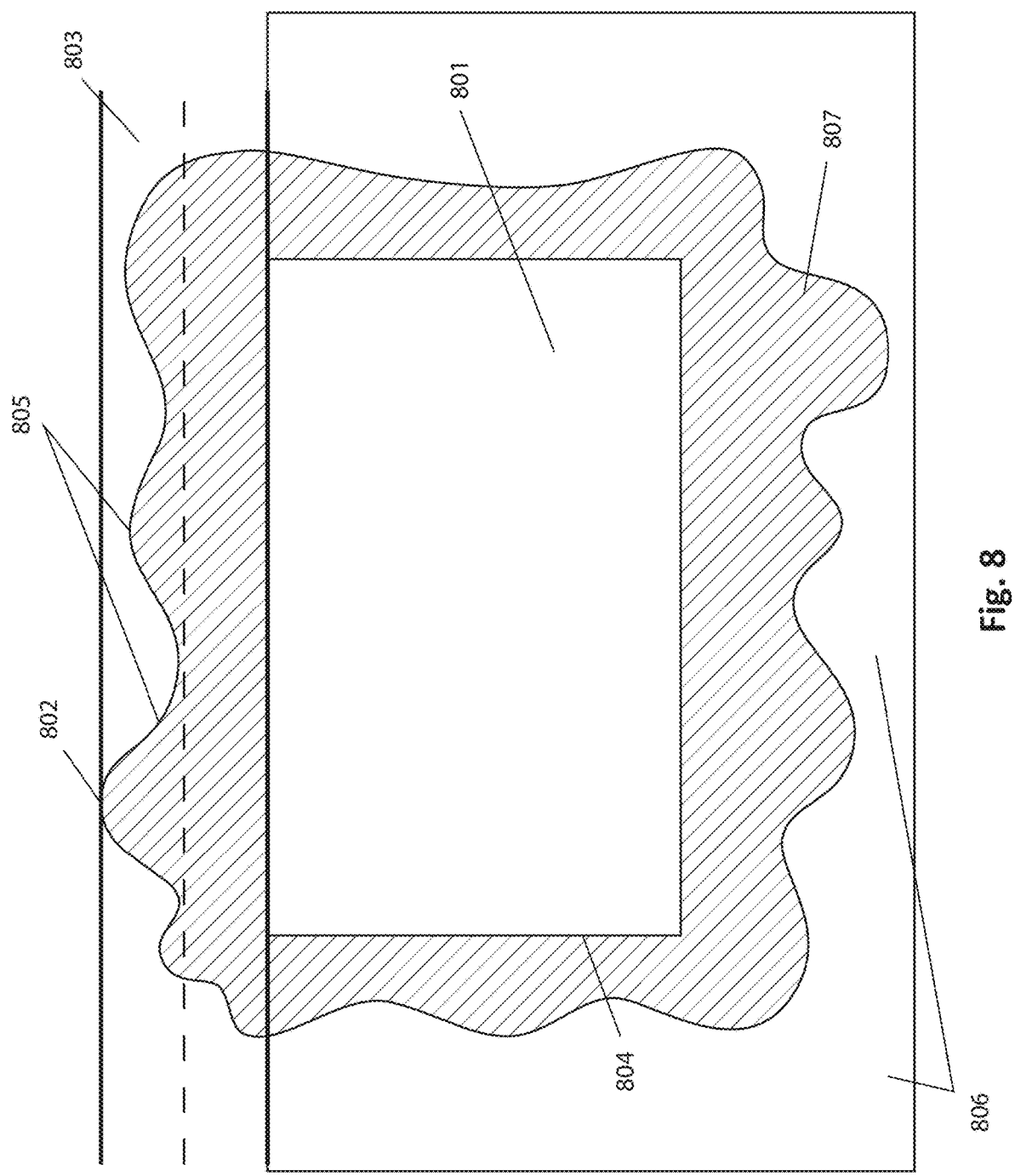
FIG. 8 illustrates a map of a region which includes a fuzzy boundary extending onto a road and public land.

FIG. 8 is an illustration of an exemplary embodiment of the fuzzy boundary 807 of a geofenced area 801, where the fuzzy boundary 807 extends at least partially over geographic features such as road 803 and public land 806. In some embodiments, fuzzy boundary 207 will have an irregular shape bounded by outer perimeter 805, thus increasing the difficultly for pest animals to ascertain the extent of the fuzzy boundary 807. Fuzzy boundary 807 may extend onto public thoroughfares, such as road 803, at various distances across the road including the entirety of the road at 802 to deter pest animals completely from road 803. Fuzzy boundary 807 may also extend onto public land 806 at varying distances, with the distances changing randomly or pseudo-randomly such a pest animal would find it difficult to learn the extent of the fuzzy boundary 807.

Figure 9:
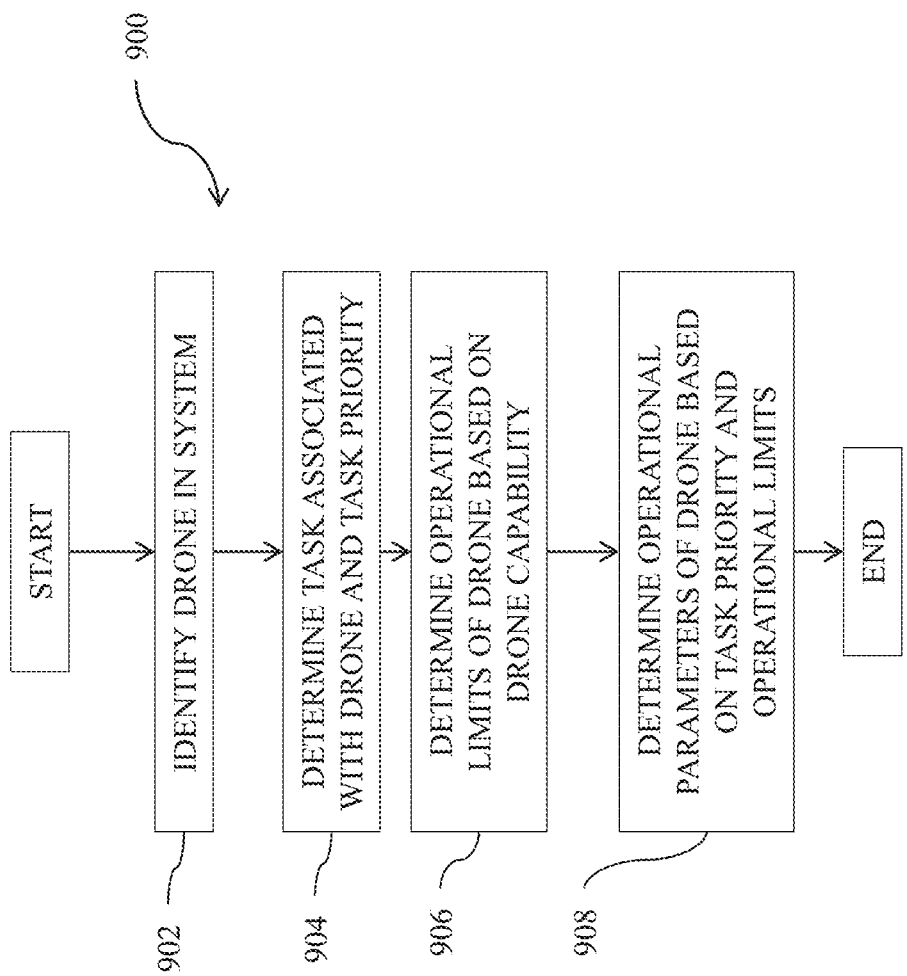
FIG. 9 is a schematic depicting operational steps in determining the operational limits of a drone.

FIG. 9 is a schematic depicting operational steps in determining the operational limits of a drone.

Drone system 900 identifies a drone in a drone system (step 902).

In one embodiment, drone system 900 identifies a drone in a drone system using a drone-specific identifier using a wireless communications medium. For example, drone system 900 can scan for available drones based on a service set identifier (SSID) over a wireless fidelity (WiFi) network. Drone system 900 can assign a trackable identifier to each detected drone and connect each drone to a dedicated wireless network to establish communications with the drone.

In a related embodiment, drone system 900 identifies one or more drones based on one or more conditions. For example, drone system 900 can identify all drones within a 100 meter radius of a geographic location to complete a location-specific task. In another example, drone system 900 can identify one or more drones above a threshold payload capacity of 10 kilograms (kg) based on an operation requiring the transport of 1,000 8 kilogram units to another location.

In another embodiment, drone system 900 is manually programmed to connect to a drone. For example, drone system 900 can be preconfigured to connect with a specific set of drones each having a preset identifier. It is contemplated that drone system 900 can be programmed by a user to connect to a specific set of drones and/or to add or remove drones from the drone system.

However, it is contemplated that drone system 900 can identify a drone in a drone system in any manner known in the art.

Drone system 900 determines a task and task priority associated with the drone (step 904).

It is contemplated that tasks and task priorities can be predetermined or dynamically determined based on the situation. In one embodiment, drone system 900 can determine a task and task priority associated with a drone by accessing a database containing task data and drone data. For example, drone system 900 can identify the drone's identification tag, compare the identification tag to records in a database, and determine that the drone is assigned a high priority task of patrolling an area of a farm to deter avian pests.

In another embodiment, drone system 900 determines a task priority for a task dynamically based on one or more situational variables. For example, drone system 900 can determine that the task of chasing away avian pests is a low priority when there is heavy precipitation because rainy weather is associated with reduced avian activity. In another example, drone system 900 can determine that a drone has only 3 functional rotors out of 4 and, based on the reduction in drone capabilities, correspondingly decrease the task priority associated with chasing away large birds of prey and increase the task priority for chasing away small to medium sized birds.

Drone system 900 determines one or more operational limits of the drone based on drone capabilities (step 906).

It is contemplated that drone system 900 can use any means of determining the operational limits of a drone. In one embodiment, drone system 900 accesses data regarding the operational limits of the drone. For example, drone system 900 can access a database with each drone's identification tag and their associated operational limits.

In another embodiment, drone system 900 accesses data regarding the components of a drone and their characteristics to determine the operational limits of a drone. For example, drone system 900 can access a database that indicates the components associated with each drone. Drone system can then compare the component operational limits (e.g., rotor replacement at 3000 hour flight time) and the current operational status of a component (e.g., 1500 hours since last rotor replacement) to determine the operational limits of the drone.

Drone system 900 determines operational parameters of the drone based on the task priority and the one or more operational limits (step 908).

It is contemplated that drone system 900 balances a task priority and one or more operational limits of a drone in any manner known in the art.

In one embodiment, drone system 900 determines that a task falls within the operational limits of the drone and determines that no change in operational parameters is required. For example, drone system 900 can determine that a task that will take 5 hours of flight time to complete falls within the 55 hours of flight time remaining before the drone has scheduled maintenance. As a result, drone system 900 determines that no change in the operational parameters is required and the drone executes the task.

In another embodiment, drone system 900 determines that a task falls outside the operational limits of the drone and determines that the operational parameters require adjustment. For example, drone system 900 can determine that a task will take 20 hours of flight time to complete does not fall within the 10 hours of remaining flight time before the drone requires scheduled maintenance. As such, drone system 900 changes the operational parameters of the drone such that the drone flies to a maintenance bay 10 hours into the task and a second drone with sufficient flight time completes the remainder of the task.

Figure 10:
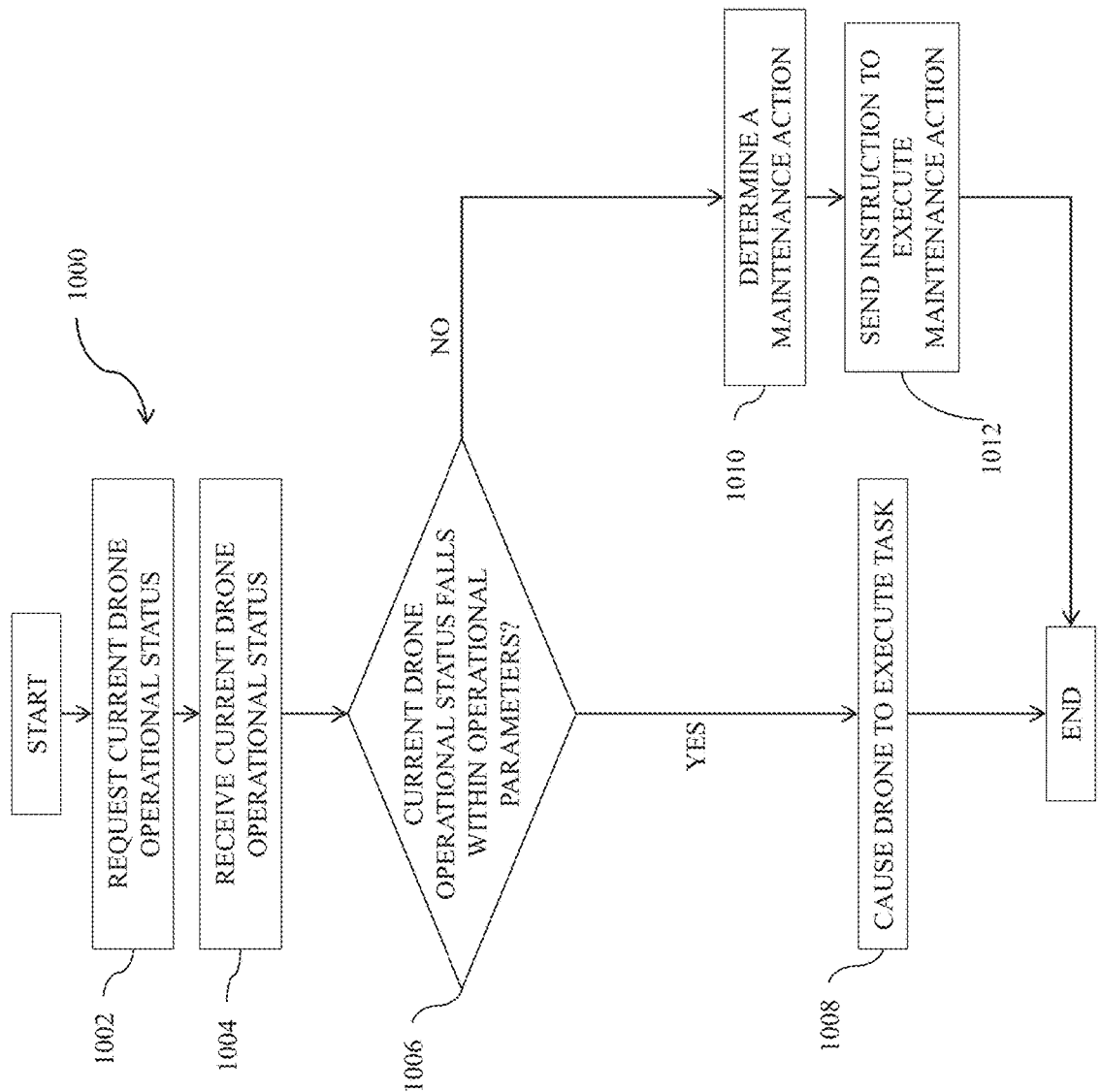
FIG. 10 is a schematic depicting operation steps involved in determining whether the operational limit of a drone falls within operational parameters.

FIG. 10 is a schematic depicting operation steps involved in determining whether the operational limit of a drone falls within operational parameters.

Drone system 900 requests current drone operational status (step 1002).

Drone system 900 can request current drone operational status using any communication medium known in the art. In one embodiment, drone system 900 can request a current drone operational status using a WiFi-based communications network. In another embodiment, drone system 900 can request a current drone operational status using a near-field communications means, including, for example, optical communication systems and radio-frequency-based communication systems.

Drone system 900 receives current drone operational status (step 1004).

It is contemplated that drone system 900 can receive current drone operational status on a per-request basis, an intermittent basis, and a continuous basis. A current drone operational status can comprise any information regarding a drone. For example, a current drone operational status can comprise operational time since last maintenance, component wear data, total battery capacity, remaining battery level, In one embodiment, drone system 900 receives the drone operational status in response to a request for a current drone operational status. For example, a user can request the operational status of a particular drone via a user interface coupled to drone system 900. In response, drone system 900 can receive the operational status from the particular drone.

In another embodiment, drone system 900 receives a drone operational status without requesting the drone operational status. For example, one or more drones can be configured to report their respective operational statuses to drone system 900 once an hour or upon a catastrophic malfunction of the drone. In another example, one or more drones can be in constant communication with drone system 900, such that drone system 900 receives the current drone operational status in substantially real time.

Drone system 900 determines whether the current drone operational status falls within the operational parameters of the task (decision block 1006).

In one embodiment, drone system 900 determines whether the current drone operational status allows the drone to complete a task at hand. For example, drone system 900 can determine whether the remaining flight time of a drone before maintenance is sufficient to complete a task requiring 4 hours of flight time.

In another embodiment, drone system 900 determines whether the current drone operational status falls at least partly within the operational parameters. For example, drone system 900 can determine that a drone with a maximum payload capacity of 10 kilograms can complete one part of a task requiring a mixture of 8 kilogram items and 15 kilogram items to be moved to another geographic location.

Responsive to determining that the current drone operational status falls within the operational parameters ("YES" branch, decision block 1006), drone system 900 causes the drone to execute the task (step 1008).

It is contemplated that drone system 900 can determine that the current drone operational status falls completely within the operational parameters. For example, drone system 900 can determine that a heavy duty aerial drone that can withstand 50+ kilometer per hour wind speeds and is weatherproofed to be operational during heavy rain can fully satisfy the operational parameters of a task entailing a simple patrol of a geographic location on a windless and sunny day.

As discussed above in step 1006, drone system 900 can determine that the current drone operational status falls partially within the operational parameters. For example, drone system 900 can determine that a land-based drone with a 2 horsepower engine and a ground clearance of 6 inches can traverse a portion of a geographical location to complete a task but will not be able to traverse the rougher terrain in the geographical location. In situation where a drone is only partially capable of completing a task, it is contemplated that drone system 900 can recruit other drones that can complete the remaining portion of the task.

Responsive to determining that the current drone operational status does not fall within the operational parameters ("NO" branch, decision block 1006), drone system 900 determines a maintenance action to execute (step 1010).

It is contemplated that drone system 900 can determine that the current drone operational status partially falls outside of the operational parameters and determine whether a maintenance action is required. Maintenance actions can include an affirmative action or the absence of an assigned action.

For example, drone system 900 can determine that a drone does not have sufficient remaining battery life to complete the task. In response, drone system 900 can send program instructions that cause a drone to make progress on a task until 5% of the total battery life remains. Upon reaching the 5% threshold, drone system 900 can cause the drone to navigate to a charging pad where the maintenance action consists of recharging the battery and sending the drone back out to complete the task.

In another example, drone system 900 can determine that a drone has one rotor that spins at a lower RPM than the other three rotors. The malfunctioning rotor can be sufficient to meet the task requirements but carries a risk of failure that rises above a tolerable threshold. In response, drone system 900 can cause the drone to navigate to a maintenance station where the rotor is replaced.

In one embodiment, drone system 900 can determine that the maintenance action requires the drone to perform a series of self-maintenance actions to bring the drone into a functional state. For example, drone system 900 can determine that a small aerial drone is slightly heavier than normal which causes the battery to die more quickly and the flight time to decrease. Drone system 900 can determine that the excess weight is due to dew that accumulates on the surface of the drone in the mornings. In response, drone system 900 can determine that the maintenance action is to have the drone perform a series of aerial maneuvers with rapid directional changes to remove water from the body of the drone.

In another embodiment, drone system 900 can determine that the current operational status of a drone completely falls outside the operational parameters and requires a maintenance action. For example, drone system 900 can determine that an aerial drone used to patrol a densely wooded geographical area with a malfunctioning proximity sensor cannot complete the task. In response, drone system 900 can cause the aerial drone to navigate to a maintenance stations.

In situations where a drone is completely non-functional, it is contemplated that drone system 900 can cause a second, functional drone to retrieve the non-functional drone.

Drone system 900 sends one or more program instructions to cause the drone to execute the maintenance action (step 1012).

It is contemplated that drone system 900 can communicate with one or more drones using any communications medium known in the art. In a preferred embodiment, drone system 900 sends the one or more program instructions wirelessly. For example, drone system 900 can send program instructions to cause a drone to fly to the location of a maintenance bay through a WiFi network. In another example, drone system 900 can use a cellular data network to send program instructions causing a drone to fly to a maintenance bay. In yet another example, drone system 900 can use an optical signaling system, such as infrared (IR) signals.

In some embodiments, drone system 900 sends program instructions for a drone to perform maintenance checks on the drone components. For example, drone system 900 can cause an aerial drone to perform a variety of movements to test whether the components involved in causing the drone to execute complex movements are syncing together correctly. In another example, drone system 900 can cause a drone to send a series of wireless signals in a specific order to determine whether the communications components of the drone are working correctly.

Figure 11:
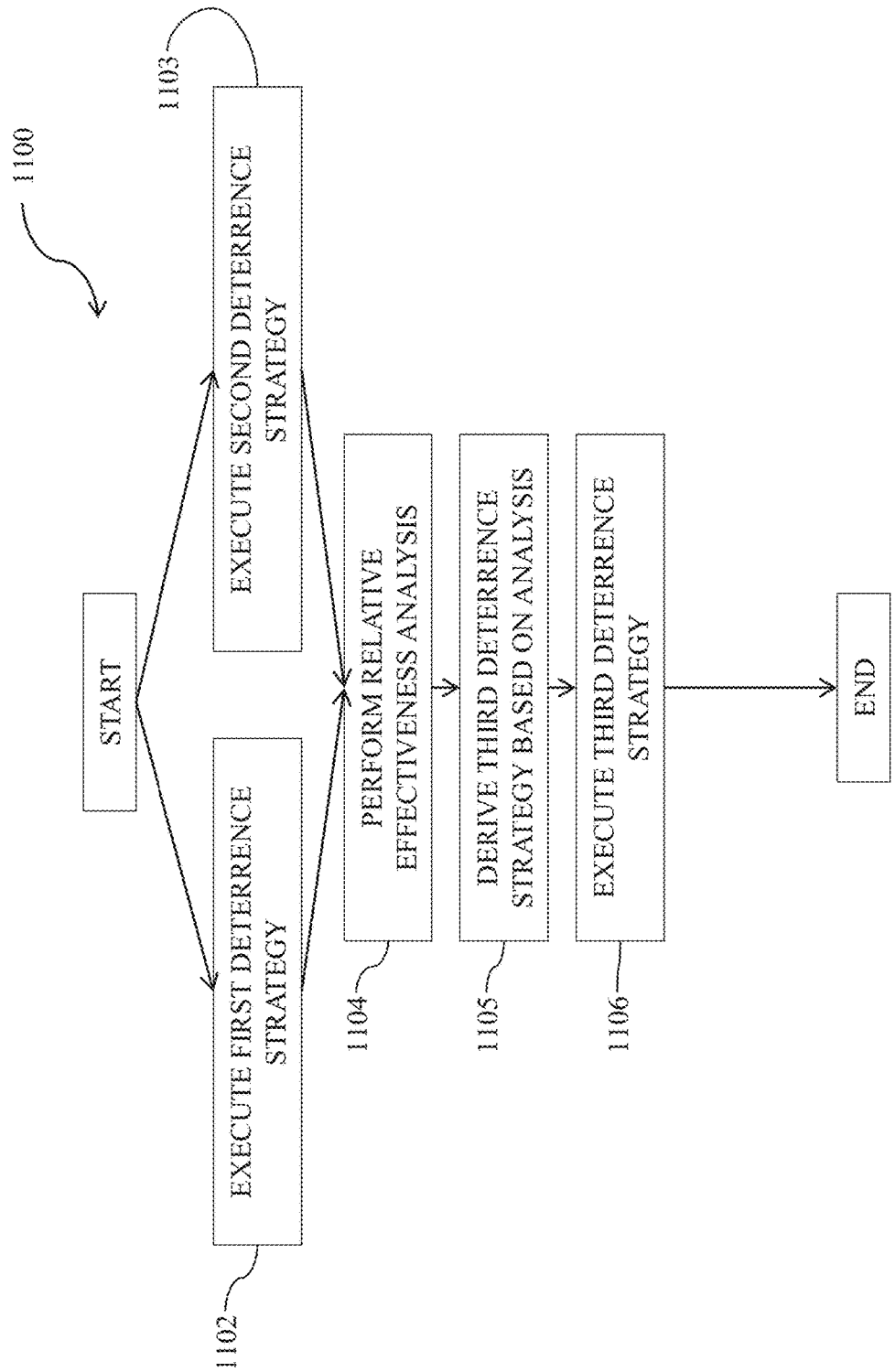
FIG. 11 illustrates a flowchart showing a method of utilizing completed deterrence strategies to derive a third deterrence strategy.

FIG. 11 is a flowchart of a preferred embodiment of the deterrence strategy optimization system 1100 wherein the results from first deterrence strategy execution 1102 and second deterrence strategy execution 1103 are processed through relative effectiveness analysis 1104 and third deterrence strategy derivation 1105 to facilitate third deterrence strategy execution 1106.

In one embodiment, the execution of the first deterrence strategy 1102 and second deterrence strategy 1103 comprises selecting a deterrence strategy based on the type of the pest animal. The pest animal type can be determined from the pest animals feather coloration, species, feather size, or the type of food consumed by the pest animal. For example, a pest animal that has white feathers greater than four inches in length and is observed eating lettuce would likely be determined to be of the goose pest animal type.

In a related embodiment, the execution of the first deterrence strategy 1102 and second deterrence strategy 1103 comprises selecting a deterrence strategy based on the pest animal behavior. The pest animal behavior can include directional changes of the pest animal in flight, speed of travel, posture, flight pattern, feeding style, and flocking pattern. For example, if a pest animal had few directional changes during flight, flew with a flight speed of about 65 km/h, flocked with greater than ten similar colored and shaped pest animals, then the pest animal would be assigned a deterrence strategy suited to its behavior pattern.

Figure 12:
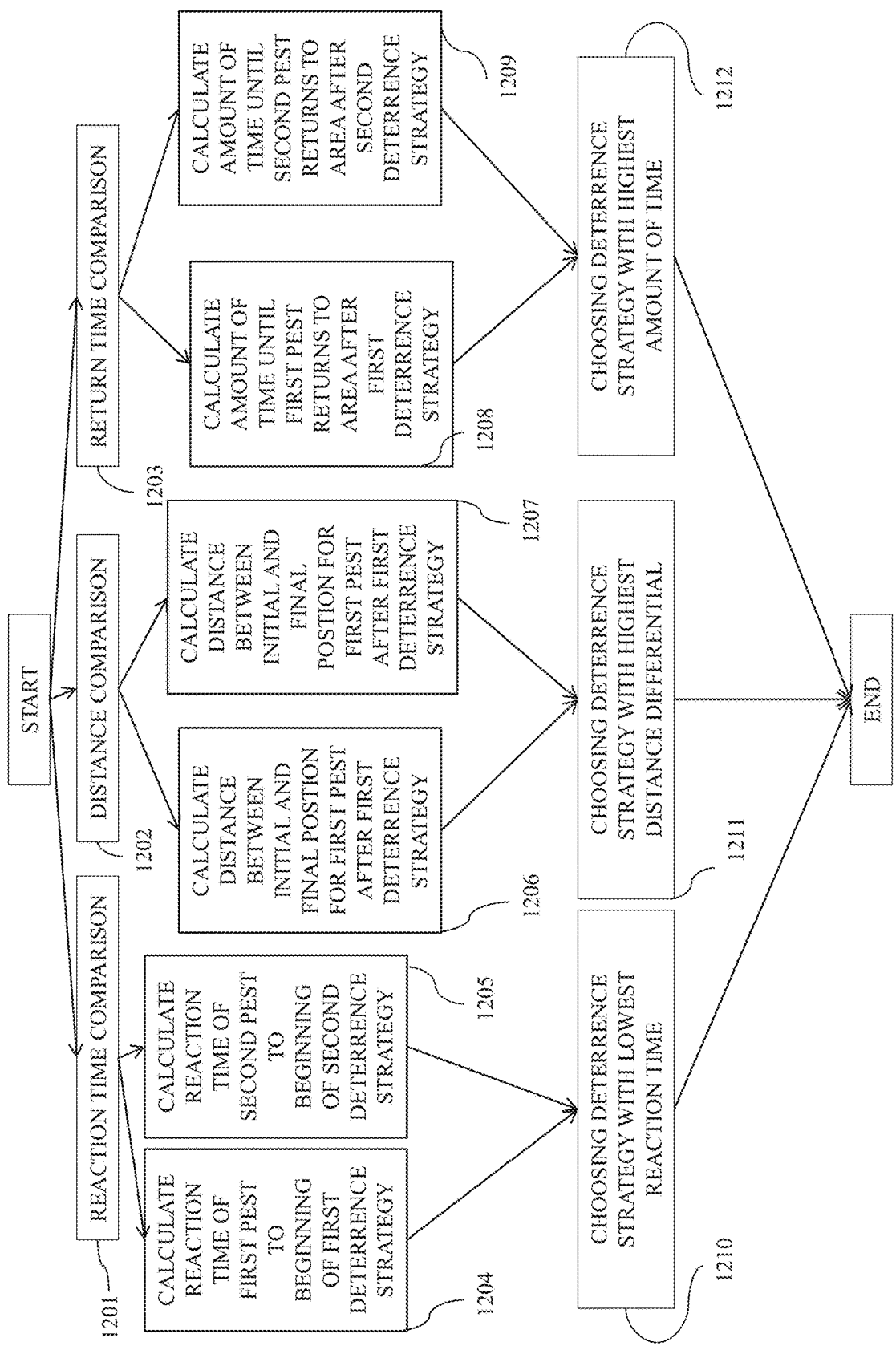
FIG. 12 illustrates a flowchart showing a method of repelling a pest animal using a pest deterrent device.

The relative effectiveness analysis 1104 processes the results of first deterrence strategy 1102 and second deterrence strategy 1103, and derives a third deterrence strategy 1105 based on the analysis. In some embodiments, the step of performing the relative effectiveness analysis 1104 comprises the comparisons outlined in FIG. 12. The Reaction Time Comparison 1201 compares the reaction time of the first one of the pest animals at the beginning of the first attack pattern 1204, and the reaction time of the second one of the pest animals at the beginning of the second deterrence strategy 1205. Then the deterrence strategy with the lowest reaction time is chosen 1210. The chosen deterrence strategy in 1210 is a preferred embodiment, and is meant to remove the pest animals from an area as quickly as possible, thus choosing the deterrence strategy that the pest animal reacts to most quickly, compared to other deterrence strategies, is preferred.

Distance Comparison 1202 compares the distance between an initial position and a final position of the first one of the pest animals after the first deterrence strategy 1206, and between an initial position and a final position of the second one of the pest animals after the second deterrence strategy 1207. Then the deterrence strategy with the highest distance differential is chosen 1211. The chosen deterrence strategy in 1211 is a preferred embodiment, and is meant to remove the pest animals from an area to the farthest possible distance away from the original area. Thus, choosing the deterrence strategy that will result in the pest animals travelling the farthest distance away is preferred.

Return Time Comparison 1203 compares the difference between the amount of time for the first one of the pest animals to return to the area after the execution of the first deterrence strategy 1208, and the amount of time for the second one of the pest animals to return to the area after the execution of the second deterrence strategy 1209. Then the deterrence strategy with the highest amount of time is chosen 1212. The chosen deterrence strategy 1212 is a preferred embodiment, and is meant to remove the pest animals for the longest possible period of time from the original area. Thus, choosing the deterrence strategy that will result in the pets being deterred from the area for the longest period time is preferred.

Figure 13:
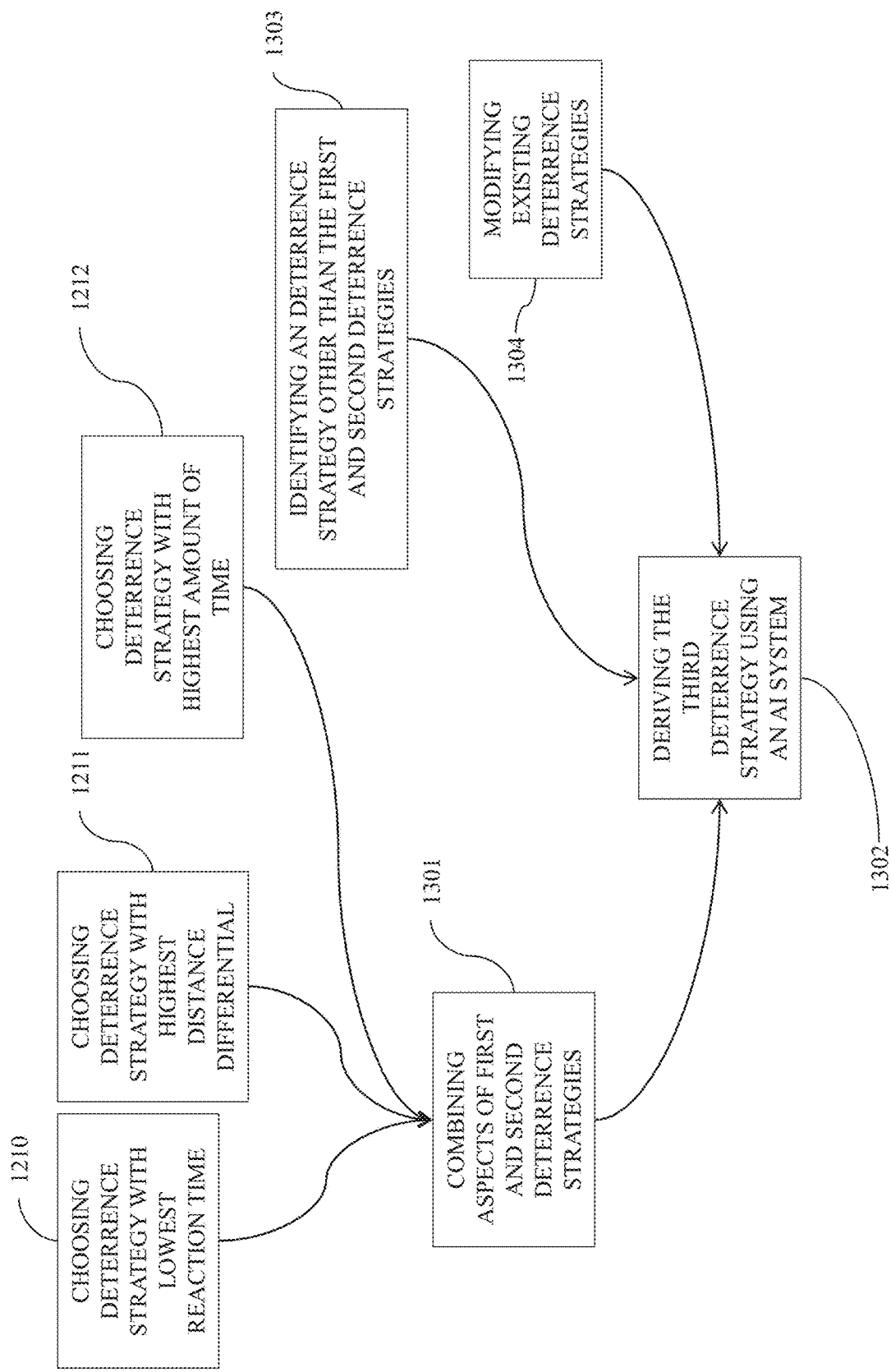
FIG. 13 illustrates the relative effectiveness analysis process.

FIG. 13 illustrates an exemplary embodiment of third deterrence strategy derivation process 1305. In one embodiment, the results from 1210, 1211, and 1212 comprise aspects of deterrence strategies. Other aspects could include natural environmental data such as the wind speed, air quality, extent of cloud cover, or weather patterns that occur on or near the time of the deterrence strategy execution. For example, air speeds above 65 km/h could hinder the ability of certain pest animals to take flight, or run away due to their size or body structure. Air quality could affect the effectiveness of a deterrence strategy by hampering the ability for certain pest animals to respond to the deterrence strategy due to relative unavailability of oxygen on the environment. For example, an AQI of 1200 could hinder the speed at which a squirrel would be deterred from an area more so than a goose due to the goose's larger lung capacity and oxygen needs. Cloud cover may also affect the effectiveness of a deterrence strategy by lessening the visibility of a pest deterrent device to the pest animal such that the pest animal will react less quickly to the device due to lowered visibility. Weather patterns such as rain, thunderstorms, and hurricane may also affect the effectiveness of deterrence strategies. For example, during a thunderstorm, a deterrence strategy meant to remove certain pests from a tree may be less effective as the pest animals' perception of possible harm from the pest deterrent device is lower than the possible harm of flying in a thunderstorm.

Additional aspects could also include unnatural environmental data such the prevalence of vehicle noise, a vehicles size, pest animal proximity to vehicles being operated by humans, the amount of vehicles near the pest animals, regularity of vehicles presence near the location in which the pest animal currently resides. Other data could include the types of pest animals that were deterred, data on the extent to which each pest animal altered its behavior based on the other pest animals around it, and other related datasets. All these aspects would be combined in combination process of 1301.

The step of derivation using an AI system 1302 comprises modifying existing deterrence strategies 1304 and identifying deterrence strategies 1303. The AI system 1302 may comprise Supervised Learning, Unsupervised Learning, Semi-supervised Learning, and Reinforcement Learning models to derive the third attack pattern. In one embodiment, the existing deterrence strategy modification step 1304 occurs as a result of external factors, such as effectiveness of the strategy when executed against certain pest animals in certain conditions, or internal factors, such as randomly modifying portions of the deterrence strategy for testing in reality. In another embodiment, the step of identifying deterrence strategies other than the first and second deterrence strategies 1303 comprises producing a list of differences between the first and second strategies, and creating a third deterrence strategy based on those differences.

Figure 14:
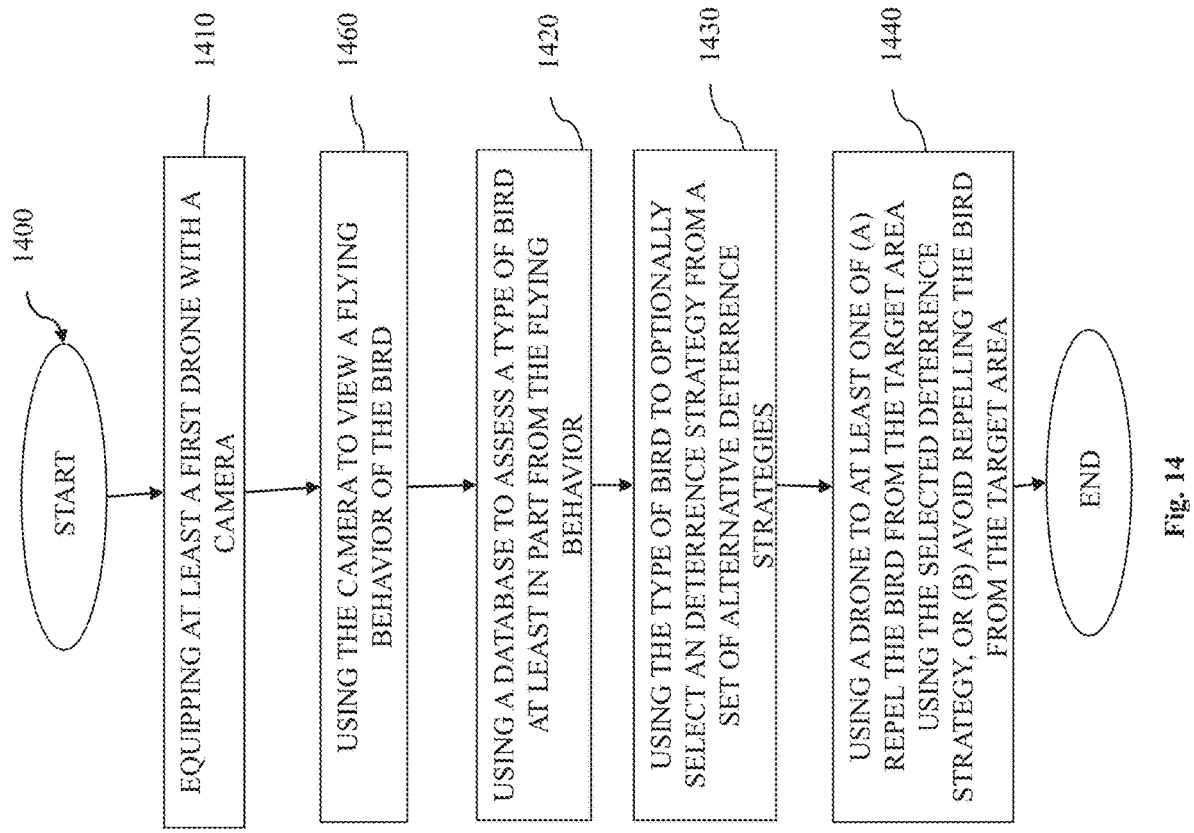
FIG. 14 illustrates a flowchart showing a method of deriving the third deterrence strategy using the relative effectiveness analysis process, the AI system, identification of other deterrence strategies, and modification of existing deterrence strategies.

FIG. 14 illustrates a preferred embodiment of method 1400 of repelling a pest animal from a target area using a pest deterrent device by identifying a type of the pest animal. The method begins with a step of equipping a pest deterrent device with a camera and continues with a step of using the camera to view a flying behavior of the pest animal. An unmanned aerial vehicle, commonly known as a pest deterrent device, is an aircraft without a human pilot aboard. Pest deterrent devices can be controlled autonomously without a pilot, such that it can be used for repelling the flying pest animals from the target area without human involvement.

The camera allows to take consecutive pictures of the flying pest animal for a certain amount of time as well as to take a video of the flying pest animal. The flying behavior can be determined by at least one of flight speed, directional changes in flight and feather movement or any combination thereof. The flying speed can be fast, slow or intermediate. The flight directional changes in flight can include zigzag changes, circular changes, no changes in the direction, or any combination thereof. The feather movement includes feather quickly moving up and down, feather with no movement, feather slowly moving up and down, or any combination thereof. The combination of the information allows to make a conclusion in the flying behavior. For example, a pest animal is flying straight, very fast, with no movement of the feather.

The method further continues with a step of using a database to assess a type of pest animal at least in part from the flying behavior. Once the flying behavior of the flying pest animal is determined, a type of the pest animal can be accessed from the flight behavior using database. The type of pest animal can be classified by a Linnaeus classification, a wingspan, a preferred food, and a flocking behavior. Linnaeus classification describes pest animals with 554 species, for examples, swallows, sparrows, crows, eagles, hawks, and so on. By using flying behavior of the flying pest animal and comparing with database, a specific species or the group of pest animal species can be selected. The selection can further narrow down by applying the size and shape of wingspan and a flocking behavior.

The method further includes a step of using the type of pest animal to optionally select a deterrence strategy from a set of alternative deterrence strategies. The alternative deterrence strategy includes a simple chase mode, a zigzagging chase mode, a repeated chasing and withdrawing mode, a circling descent mode, a random attack mode, lay in wait mode. The simple chase mode is the mode where the pest deterrent device simply chases after the pest animal. The zigzagging chase mode is the mode where the pest deterrent device makes a horizontally or vertically zigzag flight. The alternating points of a zigzag can be pointy (e.g. "w" shaped), curved (e.g. "s" shaped), or irregularly shaped. The repeated chasing and withdrawing mode is the mode where the pest deterrent device chases the pest animal for a while and then withdraws from the pest animal for a while repeatedly. The mode can be useful for repelling the pest animal that comes to the target area many times. Because the mode may provide uncomfortable feeling to the pest animal, the pest animal never come back to the target area.

The circular descent mode is the mode where the pest deterrent device suddenly stops chasing the pest animal and make a circular descent motion. The mode can be useful when the pest animal chasing pest deterrent device comes close to the boundary between the target area and non-target area. When the pest animal observes the pest deterrent device's circular motion, the pest animal may not be able to find the spot to return to the target area because all area seems to be blocked by the pest deterrent device. Thus, the pest animal may abandon to come back to the target area. The random attack mode is the mode where the pest deterrent device randomly attacks the pest animal in the middle of non-attacking period. The lay in wait mode is a part of the random attack mode where the pest deterrent device ignores the flying pest animal.

The alternative deterrence strategy further comprises alternately chasing after different pest animals. For example, when an attacking pest deterrent device is running out of a battery, the pest animal chasing pest deterrent device is switched to another pest deterrent device, thereby continuously can chase the pest animal. The pest deterrent device generally chases until the pest animal crossed away from the target area. However, the boundary between the target area and non-target area is a fuzzy boundary, such that the pest animal cannot learn the exact boundary, as a result, the pest animal avoids coming close to the target area.

Once the deterrence strategy is selected, the method is completed with a step of using a pest deterrent device either repelling the pest animal from the target area using the selected deterrence strategy or avoiding repelling the pest animal from the target area. When the flying pest animal is identified as the type of the pest animal that is not necessary for chasing, the pest deterrent device ignores the presence of the flying pest animal.

Figure 15:
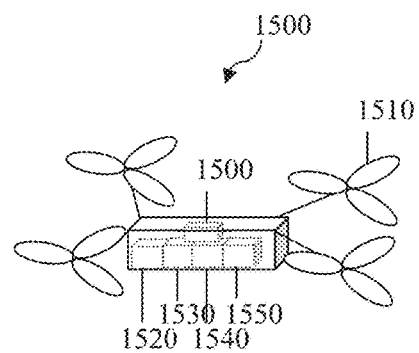
FIG. 15 is a perspective view of a maintenance robot.

FIG. 15 generally depicts an autonomous maintenance robot 1500 having 1) at least four rotors 1510, 2) a communication circuit 1520 to receive a rescue signal or other information from working robot, 2) an identification system 1530 to identify a impaired working robot, 3) a first navigation system 1540, and an optional second navigation system 1550. Other signals that could be used to identify that a working robot is broken include the working robot being outside of a designated region. The rescue signal or other information can be sent directly or indirectly from the impaired working robot to the maintenance robot, or could come from a management system, or source altogether.

Figure 16A:
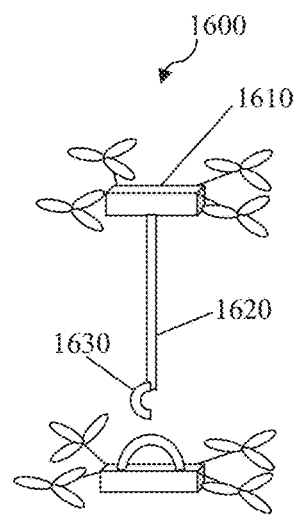
FIG. 16A shows a maintenance robot with a grasper (before locking).

FIG. 16A depicts a maintenance robot 1610 in which a grasper 1630 is extended from a body of the maintenance robot 1610. In some contemplated embodiments, the body of the maintenance robot can internally store the grasper when it is not in use. When the maintenance robot comes to the location where the impaired robot exists, the grasper 1630 is extended 1620 from the body of the maintenance robot. A positioning sensor in the maintenance robot then navigates the maintenance robot to grasp the impaired working robot.

Figure 16B:
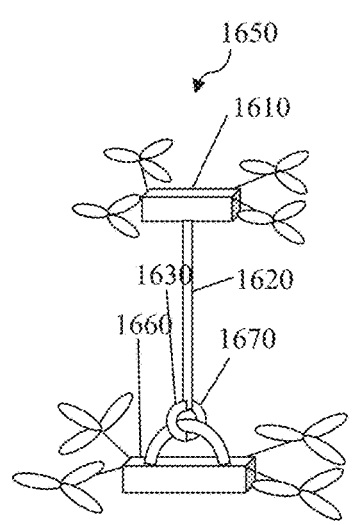
FIG. 16B shows a maintenance robot with a grasper (after locking).

FIG. 16B depicts a maintenance robot 1610 grasping the impaired working robot 1660. In this embodiment, the grasper 1630 has at least one movable component 1670, that facilitates the grasping operation.

Figure 17:
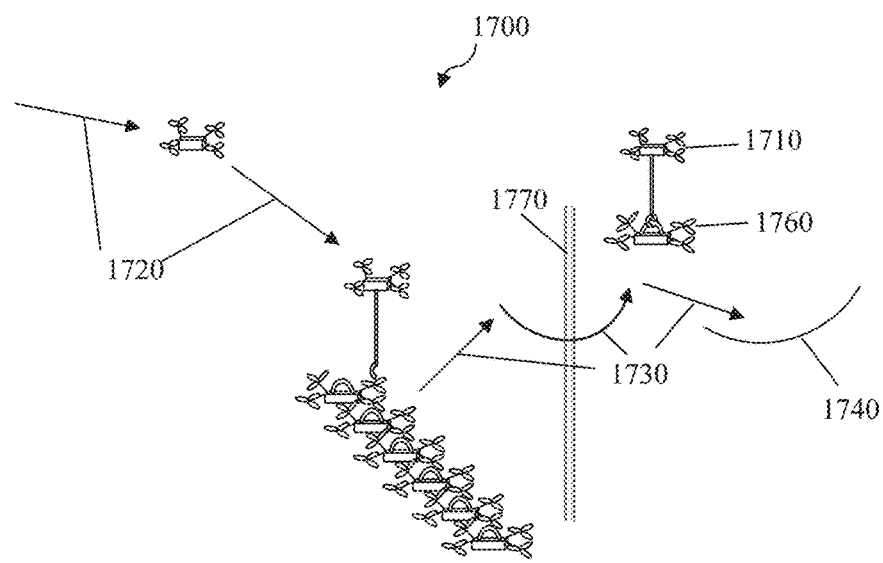
FIG. 17 shows a maintenance robot picking up a impaired robot and bringing it to a maintenance location.

FIG. 17 depicts flight paths 1720, 1730 for the maintenance robot 1710 to bring the impaired working robot 1760 to the maintenance location 1740. In some embodiments, the maintenance robot 1710 can include a sensor-based obstacle avoidance system.

In some embodiments, the maintenance robot can further include a sensor to detect weather conditions, and/or a memory to store ranges of the working weather condition. Weather conditions contemplated to be relevant include wind speed, rainy, and ambient brightness. The maintenance robot can advantageously compare the current weather conditions with stored ranges of the working conditions, can then decide not to fly (rescue) when one of the current weather conditions is outside one of more of such ranges. It is still further contemplated that a working robot could include one or more solar cells, sufficient to provide energy for communication, and possibly operation of a GPS unit, even if the battery has been completely discharged during flight, or other operation.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A pest animal deterrent system comprising:
   a first drone, having a first sensor; and
   a computing device comprising:
   a transceiver configured to communicate with the first drone; and
   a processor configured to execute software instructions stored on a non-transitory computer-readable medium, wherein the software instructions are configured to coordinate a first movement of the first drone; and
   wherein the software instructions are further configured to establish a fuzzy boundary for a geofenced area; and controlling a flight pattern of the first drone such that the first drone spends different amounts of time in different regions of the fuzzy boundary.

2. The pest animal deterrent system of claim 1, wherein the fuzzy boundary is established depending on an environmental condition of the geofenced area.

3. A pest animal deterrent system, comprising:
   a first drone, having a first sensor; and
   a computing device comprising:
   a transceiver configured to communicate with the first drone; and
   a processor configured to execute software instructions stored on a non-transitory computer-readable medium, wherein the software instructions are configured to coordinate a first movement of the first drone; and
   further comprising using the first sensor to detect a behavior of a pest animal, wherein the software instructions are further configured to use a database to assess a type of pest animal at least in part from the behavior, and use the type of pest animal to select a deterrence strategy from a set of predetermined deterrence strategies.

4. The pest animal deterrent system of claim 3, wherein the deterrence strategy is selected from the group consisting of at least one of: a simple chase mode, a zigzagging chase mode, a repeated chasing and withdrawing, a circling descent, a random attack, fuzzy boundaries, alternately chasing after different pest animals, lying in wait.

5. A pest animal deterrent system, comprising:
   a first drone, having a first sensor; and
   a computing device comprising:
   a transceiver configured to communicate with the first drone; and
   a processor configured to execute software instructions stored on a non-transitory computer-readable medium, wherein the software instructions are configured to coordinate a first movement of the first drone; and
   wherein the first drone has an attack mechanism selected from the group consisting of a telescoping probe, a flat speaker, a flashing light, and a liquid sprayer.

6. The pest animal deterrent system of claim 5, wherein the attack mechanism is configured to release projectiles.

7. A pest animal deterrent system, comprising:
   a first drone having a first sensor; and
   a computing device comprising:
   a transceiver configured to communicate with the first drone; and
   a processor configured to execute software instructions stored on a non-transitory computer-readable medium, wherein the software instructions are configured to coordinate a first movement of the first drone; and
   further comprising a data store that keeps track of relative effectiveness of at least a first deterrence strategy and a second deterrence strategy.

8. The pest animal deterrent system of claim 7, wherein the software instructions are further configured to perform an analysis of a relative effectiveness of the first and second deterrence strategies, and use the analysis to derive a third deterrence strategy.

9. The pest animal deterrent system of claim 7, wherein the software is further configured to differently apply the first and second deterrence strategies as a function of different environmental conditions.

10. A pest animal deterrent system, comprising:
    a first drone, having a first sensor; and
    a computing device comprising:
    a transceiver configured to communicate with the first drone;
    a processer configured to execute software instructions stored on a non-transitory computer-readable medium, wherein the software instructions are configured to coordinate a first movement of the first drone;
    a second drone, having a second sensor; and wherein the software instructions are configured to coordinate a second movement of the second drone; and
    wherein the software instructions are further configured to coordinate the first and second movements of each of the first and second drones, respectively, as part of a deterrence strategy to increase the effectiveness of the pest animal deterrent system.

11. The pest animal deterrent system of claim 10, wherein the deterrence strategy comprises at least one of: (1) the first drone driving a target pest animal toward the second drone, (2) the first and second drones both circling and spiraling down to a target pest animal, (3) each of the first and second drones repeatedly attacking and withdrawing relative to a target pest animal, (4) the first and second drones using different fuzzy boundaries, (5) the first and second drones serially attacking a target pest animal, (6) the first drone scattering a group of target pest animals while the second drone circles the group, and (7) each of the first and second drones lying in wait.

12. The pest animal deterrent system of claim 1, further comprising: a communication circuit configured to receive a rescue signal from the first drone; a navigation system configured to direct the second drone to the first drone, and direct the second drone to bring the first drone to a maintenance location.

13. The pest animal deterrent system of claim 12, further comprising a grasper having at least one moveable component, configured to grasp the first drone.

14. The pest animal deterrent system of claim 1, wherein the software is further configured to randomly select a strategy from the group consisting of: the first drone driving a target pest animal toward the second drone; the first and second drones both circling and spiraling down to a target pest animal; the first and second drones repeatedly attacking and withdrawing relative to a target pest animal; the first and second drones using different fuzzy boundaries; the first and second drones serially attacking a target pest animal; the first drone scattering a group of target pest animals while the second drone circles the group; the first drone and the second drone simultaneously approach the pest animal from opposite directions; and each of the first and second drones lying in wait.

* * * * *